United States Patent
Fujii et al.

(10) Patent No.: US 7,463,673 B2
(45) Date of Patent: Dec. 9, 2008

(54) RADIO RELAY SYSTEM, RADIO RELAY APPARATUS, AND RADIO RELAY METHOD

(75) Inventors: Hiromasa Fujii, Yokosuka (JP); Hirohito Suda, Yokosuka (JP); Tetsu Tanaka, Zushi (JP)

(73) Assignee: NTT DoCoMo, Inc., Tokyo (JP)

( * ) Notice: Subject to any disclaimer, the term of this patent is extended or adjusted under 35 U.S.C. 154(b) by 543 days.

(21) Appl. No.: 11/057,200

(22) Filed: Feb. 15, 2005

(65) Prior Publication Data
US 2005/0190821 A1 Sep. 1, 2005

(30) Foreign Application Priority Data
Feb. 16, 2004 (JP) .............................. 2004-038564

(51) Int. Cl.
*H04B 7/14* (2006.01)
(52) U.S. Cl. .......................................... 375/211; 455/7
(58) Field of Classification Search .................. 375/211
See application file for complete search history.

(56) References Cited
U.S. PATENT DOCUMENTS
4,809,203 A * 2/1989 Wilson et al. .................. 708/3
4,972,346 A 11/1990 Kawano et al.
2003/0124976 A1 * 7/2003 Tamaki et al. .................. 455/15
2004/0192204 A1 * 9/2004 Periyalwar et al. ............. 455/25
2004/0266339 A1 * 12/2004 Larsson ........................ 455/7
2007/0116092 A1 * 5/2007 Nystrom et al. ............. 375/130

FOREIGN PATENT DOCUMENTS
| EP | 1 039 715 A1 | 9/2000 |
| JP | 9-284195 | 10/1997 |
| JP | 2003-198442 | 7/2003 |
| JP | 2003-244050 | 8/2003 |

* cited by examiner

*Primary Examiner*—Shuwang Liu
*Assistant Examiner*—David Huang
(74) *Attorney, Agent, or Firm*—Oblon, Spivak, McClelland, Maier & Neustadt, P.C.

(57) ABSTRACT

A radio relay system is disclosed that is capable of preventing communication degradation in a case where radio signals are relayed using the same frequency band in a mobile communication environment. The radio relay system includes a first radio station, a second radio station, and a radio relay apparatus for relaying a radio signal that is exchanged between the first radio station and the second radio station. The radio relay apparatus includes a phase correction determining unit that determines a phase correction amount of the relayed signal based on channel information pertaining to channels established between the first radio station, the second radio station, and the radio relay apparatus, and a phase correction unit that corrects the relayed signal based on the phase correction amount determined by the phase correction determining unit.

11 Claims, 14 Drawing Sheets

US 7,463,673 B2

RADIO RELAY SYSTEM, RADIO RELAY APPARATUS, AND RADIO RELAY METHOD

BACKGROUND OF THE INVENTION

1. Field of the Invention

The present invention relates generally to a radio relay system, a radio relay apparatus, and a radio relay method, and particularly to a radio relay system for establishing radio communication with a transmitting/receiving apparatus through one or more radio relay apparatuses.

2. Description of the Related Art

In establishing radio communication, when the distance between a transmitting apparatus and a receiving apparatus is long, or when an obstacle lies between a transmitting apparatus and a receiving apparatus, for example, sufficient reception power may not be secured. As a result, the communications quality may be significantly degraded. In response to such a problem, a so-called radio relay transmission method (radio relay method) is conventionally used for conducting signal transmission in a broadcasting system or a mobile communication system. According to the conventional radio relay method, a radio relay apparatus (relay unit) receives a signal transmitted from a transmitting apparatus, amplifies this signal, and transmits the amplified signal.

FIG. 1 is a diagram showing a configuration of a radio relay system in which the conventional radio relay method may be implemented.

The radio relay system of FIG. 1 includes a transmitting apparatus 610, a radio relay apparatus 620, and a receiving apparatus 630. In the present system, the receiving apparatus 630 may receive a signal directly from the transmitting apparatus 610, or it may receive a signal from the transmitting apparatus 610 via the radio relay apparatus 620. The radio relay apparatus 620 is arranged to receive a signal from the transmitting apparatus 610 and transmit this signal to the receiving apparatus 630.

FIG. 2 is a diagram showing an exemplary configuration of the radio relay apparatus 620. As is shown in this drawing, the radio relay apparatus 620 may include a receiving antenna 701, an amplifier 702, and a transmitting antenna 703. A signal received at the receiving antenna 701 may be amplified at the amplifier 702 to at least a certain level, after which the amplified signal may be transmitted from the transmitting antenna 703 to the receiving apparatus 630 (see FIG. 1).

In Japanese Laid-Open Patent Publication No. 9-284195, a radio relay booster is disclosed that is capable of canceling a sneak path interference signal with high accuracy in a radio relay system as is described above. According to the disclosed technology, by repeating a process of changing the current canceller control variable consisting of attenuation characteristic information and phase rotation information by a small amount, detecting the residual interference signal, and updating the canceller variable in a direction for decreasing the residual interference signal, the sneak path interference signal may be cancelled with high accuracy.

In the radio relay system as is described above that uses a direct relay method, when a direct wave is present that is to be received by a receiving apparatus directly from a transmitting apparatus without being relayed by a radio relay apparatus, unnecessary fading may occur. Thereby, the application of the conventional radio relay method may not always lead to improvement in the communications quality; in fact, in some cases, a degradation of communications quality may occur as a result of applying the conventional radio relay method. This is described in detail below.

In the radio relay system of FIG. 1, given that the transmission line for the signal being transmitted is referred to as 'channel', the channel that is received by the receiving apparatus directly from the transmitting apparatus is denoted as $h_d$, the channel that is received by the receiving apparatus from the transmitting apparatus via the radio relay apparatus is denoted as $h_i$, and the channels $h_d$ and $h_i$ may be represented by the following formulas:

$$h_d = ae^{i\theta}$$

$$h_i = a'e^{i\theta'}$$

(a and a' representing the amplitude, and $e^{i\theta}$ and $e^{i\theta'}$ representing the phase).

Accordingly, the total channel $h_{total}$ from the transmitting apparatus to the receiving apparatus including the radio relay apparatus may be represented by the following formula:

$$h_{total} = h_i + h_d = ae^{i\theta} + a'e^{i\theta'}$$

In general, the condition, $\theta \neq \theta'$, applies, and thereby, the received electrical field amplitude may not always be larger compared to a case in which only a direct wave is transmitted and received. For example, in an extreme case where a=a' and $\theta = \theta' + \pi$, the phase may be inverted so that the channel signals cancel out each other. Thereby, the signal power received at the receiving apparatus may be very small, resulting in a significant degradation of communications quality compared to a case in which radio relay is not conducted.

Such a problem may also arise due to the occurrence of unnecessary fading in a case where signals are simultaneously transmitted using the same frequency band, or in a case where radio relay is conducted by plural radio relay apparatuses, for example.

It is noted that the conventional radio relay system is primarily used for terrestrial broadcasting in which the positions of the transmitting apparatus, the receiving apparatus, and the radio relay apparatus may be prearranged. In this case, the problem as is described above may not be such a great concern. However, this problem may have to be addressed in a case where the radio relay system is applied to a mobile communication system, in which the radio relay apparatus may be under the same environmental condition as a mobile terminal (rather than being implemented in a steel tower or a building); that is, the radio relay apparatus is implemented within a mobile terminal.

In recent years and continuing, with the proliferation of broadband technology in the communication field, high speed transmission is being demanded in mobile communication systems. In turn, attention is being directed to the MIMO (Multiple-Input Multiple-Output) system as a transmission scheme for increasing transmission speed using a limited frequency band.

However, in MIMO channel signal transmission where a signal received at the radio relay apparatus is directly amplified and transmitted, when a direct wave is present or when plural radio relay apparatuses are present, for example, the channel formed between the transmitting apparatus and the receiving apparatus may not necessarily correspond to a channel suitable for increasing the communications capacity for the MIMO communication. In other words, when there is high correlation between the channels formed by the transmitting and receiving antennas of the transmitting apparatus and the receiving apparatus, an increase in communications capacity may not necessarily be achieved through MIMO channel signal transmission.

SUMMARY OF THE INVENTION

The present invention has been conceived in response to one or more of the problems of the related art, and its first object is to provide a radio relay system, a radio relay apparatus and a radio relay method for preventing the degradation of communications quality when relaying plural signals of the same frequency band within a mobile communication environment.

It is a second object of the present invention to provide a radio relay system, a radio relay apparatus and a radio relay method for increasing the communications capacity in MIMO channel signal transmission.

According to an aspect of the present invention, a radio relay system is provided that includes
- a first radio station;
- a second radio station; and
- a radio relay apparatus that relays a radio signal that is exchanged between the first radio station and the second radio station;
- wherein the radio relay apparatus includes
  - a phase correction determining unit that determines a phase correction amount for a relayed signal based on channel information pertaining to channels established between the first radio station, the second radio station, and the radio relay apparatus; and
  - a phase correction unit that corrects the relayed signal based on the phase correction amount determined by the phase correction determining unit.

According to a preferred embodiment of the present invention, the radio relay apparatus further includes
- an amplitude correction determining unit that determines an amplitude correction amount for a relayed signal based on the channel information pertaining to channels established between the first radio station, the second radio station, and the radio relay apparatus; and
- an amplitude correction unit that corrects the relayed signal based on the amplitude correction amount determined by the amplitude correction determining unit.

According to another preferred embodiment of the present invention, the channel information corresponds to channel information pertaining to a channel between the first radio station and the second radio station, channel information pertaining to a channel between the first radio station and the radio relay apparatus, and channel information pertaining to a channel between the radio relay apparatus and the second radio station, and at least one complex coefficient that represents at least one of the phase correction amount and the amplitude correction amount is determined based on the channel information.

According to another preferred embodiment of the present invention,
- the phase correction determining unit determines a complex coefficient representing a phase rotation of the relayed signal as the phase correction amount;
- the phase correction unit multiplies the relayed signal by the determined complex coefficient representing the phase rotation;
- the amplitude correction determining unit determines a complex coefficient representing a gain of an amplifier of the radio relay apparatus as the amplitude correction amount; and
- the amplitude correction unit multiplies the relayed signal by the determined complex coefficient representing the gain.

According to another preferred embodiment of the present invention,
- when the first radio station and the second radio station are each provided with one antenna, and a plurality of the radio relay apparatuses each provided with a plurality of antennas are used,
- the phase correction determining unit and the amplitude correction determining unit of at least one of the radio relay apparatuses are configured to calculate a complex coefficient representing the phase correction amount and a complex coefficient representing the amplitude correction amount, respectively, such that a transfer function from a receiving antenna of the at least one of the radio relay apparatuses to a receiving antenna of the second radio station maximizes reception quality of a channel between the first radio station and the at least one of the radio relay apparatuses.

According to another preferred embodiment of the present invention,
- when the first radio station, the second radio station, and the radio relay apparatus are each provided with a plurality of antennas, and Multiple-Input Multiple-Output channels are formed by the antennas,
- the phase correction determining unit and the amplitude correction determining unit are configured to calculate a complex coefficient representing the phase correction amount and a complex coefficient representing the amplitude correction amount, respectively, such that the channel capacity of channels between the first radio station, the second radio station, and the radio relay apparatus is maximized.

According to another preferred embodiment of the present invention,
- when the radio relay apparatus is arranged to relay a signal between the first radio station and the second radio station according to a Time Division Duplex system,
- the radio relay apparatus includes
  - a first radio station-radio relay apparatus channel estimating unit that inputs a received signal that is received from the first radio station and a pilot signal that is inserted by the first radio station, and conducts channel estimation for a channel between the first radio station and the radio relay apparatus based on the input signals;
  - a second radio station-radio relay apparatus channel estimating unit that inputs a received signal received from the second radio station and a pilot signal inserted by the second radio station, and conducts channel estimation for a channel between the second radio station and the radio relay apparatus based on the input signals; and
  - a complex coefficient multiplying unit that inputs the channel estimation of the channel between the first radio station and the radio relay apparatus, and the channel estimation of the channel between the second radio station and the radio relay apparatus as channel information, determines at least one complex coefficient representing at least one of the phase correction amount and the amplitude correction amount based on the channel information, and multiplies at least one of the received signals by the determined complex coefficient.

According to another preferred embodiment of the present invention,
- when the radio relay apparatus is arranged to relay a signal between the first radio station and the second radio station according to a Frequency Division Duplex system, the second radio station includes
- a phase/amplitude control determining unit that conducts channel estimation for a channel between the first radio station and the radio relay apparatus, a channel between the radio relay apparatus and the second radio station, and a channel between the first radio station and the second radio station, and determines a gain and phase rotation in the radio relay apparatus based on the channel estimation of the channels; and
- a feedback unit that transmits to the radio relay apparatus a feedback signal including information pertaining to the gain and phase rotation determined by the phase/amplitude control determining unit; and the radio relay apparatus includes
- a phase/amplitude control unit that controls a gain and phase rotation of a relayed signal according to the feedback signal transmitted from the feedback unit.

According to another preferred embodiment of the present invention, the first radio station includes a null signal transmitting unit that transmits null signal as a section of a transmission signal;

the radio relay apparatus includes a pilot signal relay unit that relays at least one of a plurality of pilot signals inserted by the first radio station, and a pilot signal inserting unit that inserts a predetermined pilot signal in the signal section transmitted as the null signal from the first radio station; and the second radio station includes
- a direct channel estimating unit that conducts channel estimation for a channel directly received from the first radio station based on a received signal corresponding to at least one of the pilot signals that is received without being relayed by the radio relay apparatus;
- a radio relay apparatus-second radio station channel estimating unit that conducts channel estimation for a channel between the radio relay apparatus and the second radio station based on a received signal corresponding the predetermined pilot signal that is inserted by the radio relay apparatus; and
- a first radio station-radio relay apparatus channel estimating unit that conducts channel estimation for a channel between the first radio station and the radio relay apparatus based on a received signal corresponding to the at least one of the pilot signals that is relayed by the radio relay apparatus and the channel estimation for the channel between the radio relay apparatus and the second radio station.

According to another preferred embodiment of the present invention, when signal transmission according to an Orthogonal Frequency division Multiplexing transmission scheme is conducted, the radio relay apparatus includes
- an Inverse Fast Fourier Transform unit that conducts an inverse fast Fourier transform process on a transmission signal;
- a Fast Fourier Transform unit that conducts a fast Fourier transform process on a received signal;
- a complex coefficient determining unit that conducts channel estimation for channels of a plurality of sub carriers, and calculates one or more complex coefficients for the sub carriers based on the channel estimation; and
- a complex coefficient multiplying unit that multiplies the sub carriers by the one or more complex coefficients calculated by the complex coefficient determining unit.

According to another preferred embodiment of the present invention, the sub carriers are collectively processed in calculating the complex coefficient and multiplying the calculated complex coefficient.

DETAILED DESCRIPTION OF THE PREFERRED EMBODIMENTS

In the following, preferred embodiments of the present invention are described with reference to the accompanying drawings.

First Embodiment

Figure 1:
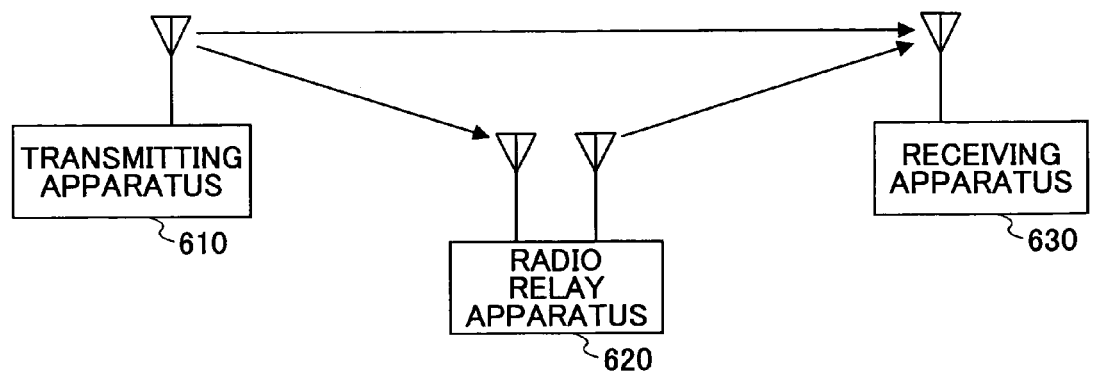
FIG. 1 is a diagram showing a conventional configuration of a radio relay system.
Figure 2:
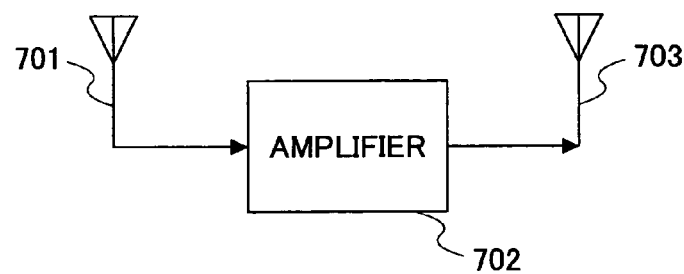
FIG. 2 is a diagram showing an exemplary configuration of a radio relay apparatus according to the prior art.

According to a first embodiment of the present invention, a radio relay apparatus as is described below is used in a radio relay system. The radio relay system of the present embodiment may have a system structure identical to that shown in FIG. 1. That is, the present radio system may include a transmitting apparatus (first wireless station), a receiving apparatus (second wireless station), and a radio relay apparatus. The radio relay apparatus may be arranged to relay a signal transmitted from the transmitting apparatus, and transmit the relayed signal using the same frequency. A signal received at the receiving apparatus may include a signal received directly from the transmitting apparatus, and a signal received via the radio relay apparatus.

Figure 3:
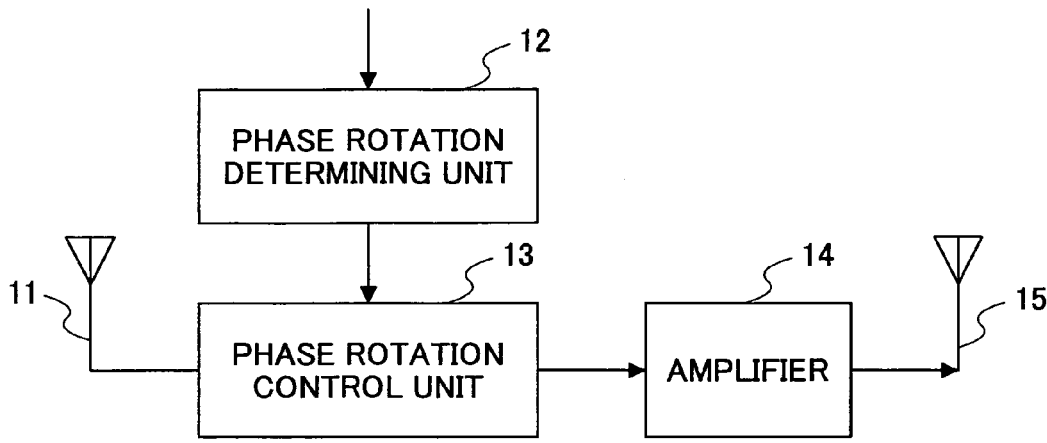
FIG. 3 is a block diagram showing an exemplary configuration of a radio relay apparatus according to a first embodiment of the present invention.

FIG. 3 is a block diagram showing an exemplary configuration of a radio relay apparatus according to a first embodiment of the present invention.

According to this drawing, the radio relay apparatus includes a receiving antenna 11, a phase rotation determining unit 12, a phase rotation control unit 13, an amplifier 14, and a transmitting antenna 15.

In the present example, a signal received by the receiving antenna 11 includes propagation delay as well as phase change and amplitude change resulting from fading within the mobile communication environment (referred to as 'fading' hereinafter). Thereby, the received signal includes phase rotation resulting from the fading. It is noted that phase rotation may be caused by factors other than fading; for example, phase rotation may result from data modulation (phase lag), or noise. However, in the present example, it is assumed that the phase rotation is caused by fading.

In the radio relay apparatus according to the present embodiment, the degree of phase rotation caused by fading is determined at the phase rotation determining unit 12, and the phase rotation of a relay signal is controlled by the phase rotation control unit 13 based on the determination result output from the rotation determining unit 12.

In the following, operations of the radio relay apparatus of the present embodiment are described.

The phase rotation determining unit 12 of the radio relay apparatus inputs channel information pertaining to the channel between the transmitting apparatus and the present radio relay apparatus, channel information pertaining to the channel between the present radio relay apparatus and the receiving apparatus, and channel information pertaining to the channel for the direct wave transmitted directly from the transmitting apparatus to the receiving apparatus. Then, based on phase information included in the input channel information, the phase rotation determining unit 12 determines the degree of phase rotation θr according to the following formula:

$$\theta r = \theta - \theta'$$

(θ representing the phase rotation given by the channel directly received from the transmitting apparatus by the receiving apparatus, and θ' representing the phase of the channel received from the transmitting apparatus via the radio relay apparatus).

Given that the channel information pertaining to the channel between the transmitting apparatus and the present radio relay apparatus is denoted as h1, and the channel information pertaining to the channel between the present radio relay apparatus and the receiving apparatus is denoted as h2, the channel information received by the receiving apparatus via the radio relay apparatus may be represented by the following formula:

$$h1 \times (\text{transfer function at radio relay apparatus}) \times h2$$

It is noted that the transfer function at the radio relay apparatus may correspond to a product of a transfer function formed by the gain control and the phase rotation, and a transfer function formed by the relay processing delay and the amplifier. The former may be variably set, whereas the latter needs to be determined beforehand. In the following descriptions, references are not made to the latter factor.

After the phase rotation θr is determined, this is input to the phase rotation control unit 13 as phase correction information. The phase rotation control unit 13 conducts complex multiplication of the signal received at the receiving antenna 11 (relayed signal) and the phase rotation θr (the relayed signal is multiplied by $e^{i\theta r}$) and outputs the resulting signal to the amplifier 14. The amplifier inputs the complex-multiplied relay signal and amplifies this input signal to control the power of the relay signal to be transmitted from the transmitting antenna 15 to a desired value.

According to the present embodiment, the channel $h_i$ received at the receiving apparatus from the transmitting apparatus via the radio relay apparatus based on the phase rotation may be represented by the following formula:

$$h_i = a'(e^{i\theta'} \times e^{i\theta r}) = a'e^{i\theta}$$

As is described above, the channel $h_d$ received at the receiving apparatus directly from the transmitting apparatus may be represented as $h_d = ae^{i\theta}$, and thereby, the channel $h_{total}$ at the receiving apparatus may be represented as:

$$h_{total} = h_i + h_d = a'e^{i\theta} + ae^{i\theta}$$

As can be appreciated from the above formula, the relay signal may be received with the same phase as that of the direct wave, and thereby, its power may be represented as $(a+a')^2$, which may be maximized under the condition that the gain is fixed during the relay process.

It is noted that the gain during the relay process may be determined based on the received signal power to noise power ratio at the receiving apparatus.

Also, it is noted that in the present embodiment, channel information pertaining to the channels between the transmitting apparatus and the radio relay apparatus, the radio relay apparatus and the receiving apparatus, and the transmitting apparatus and the receiving apparatus for the direct wave, respectively, is used as input information. In one example, channel estimation values obtained from channel estimations of links may be used as such information. As for the channel estimation method, for example, a known training signal may be attached to a transmitting signal, and when the signal is received at the receiving apparatus, a pilot signal that is multiplexed with the received signal may be extracted, and based on the phase and amplitude of this pilot signal, an impulse response may be obtained as the channel estimation value. It is noted that the above channel estimation methods as well as other various channel estimation methods may be used in the present embodiment. It is also noted that the channel estimation values obtained in the manner described above may be dynamically updated as is described below.

Also, according to the present embodiment, the phase rotation determining unit 12 determines the phase rotation of the relay signal, the phase rotation control unit 13 conducts phase controls of the relay signal by multiplying this phase rotation with the relay signal and outputting the resulting signal to the amplifier 14. It is noted that according to one example, in addition to the phase control of the relay signal, the gain of the amplifier 14 may be controlled at the same time.

Figure 4:
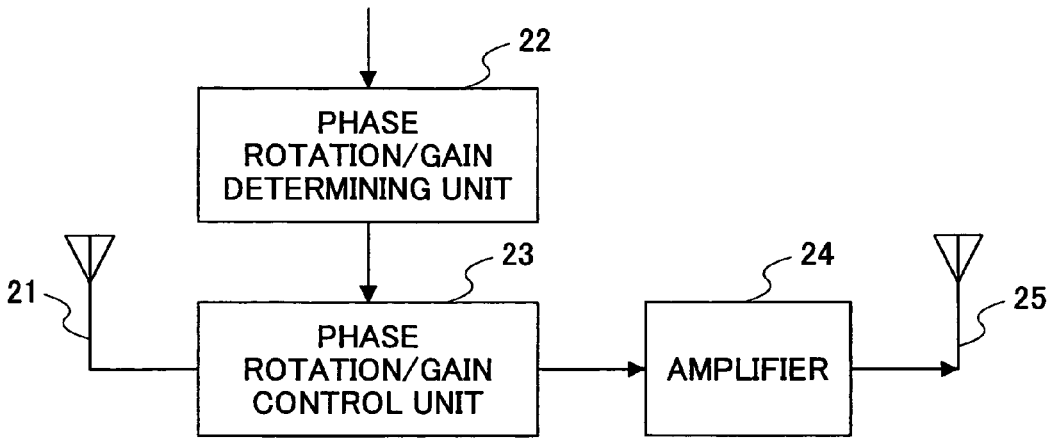
FIG. 4 is a block diagram showing another exemplary configuration of a radio relay apparatus according to the first embodiment that is arranged to control the phase of a relay signal and the gain of an amplifier.

FIG. 4 is a block diagram showing a configuration of a radio relay apparatus that is arranged to control the phase of a relay signal and the gain of the amplifier.

In the radio relay apparatus of FIG. 4, a phase rotation/gain determining unit 22 and a phase rotation/gain control unit 23 are provided in place of the phase rotation determining unit 12 and the phase rotation control unit 13 of the radio relay apparatus of FIG. 3.

According to the present example, the phase rotation/gain determining unit 22 is arranged to extract phase and amplitude information from the input channel information and determine the degree of phase rotation and the gain (amplitude correction) based on the extracted information. In the following, the operations for determining and controlling the gain of the amplifier 24 are described.

In one example, the gain may be determined based on the amplitude ratio between the amplitude of the channel directly received from the transmitting apparatus by the receiving apparatus and the channel received from the transmitting apparatus via the radio relay apparatus. The gain determined in this manner may be represented in the form of a complex coefficient, and the phase rotation/gain control unit 23 may be arranged to multiply the relay signal by the determined complex coefficient and output the resulting signal to the amplifier 24. The amplifier 24 may be arranged to input the complex coefficient-multiplied relay signal and amplify this input signal to a desired power level suitable for transmission from the transmitting antenna 25.

It is noted that according to an embodiment, in addition to determining the gain of the radio relay apparatus, the transmission power of the transmitting apparatus may be determined based on the determined factor described above and the received signal power to noise power ratio at the receiving apparatus. In this case, a control signal for controlling the transmission power may be sent to the transmitting apparatus.

As is described above, in the radio relay apparatus according to the first embodiment, the phase rotation of the relay signal is determined and controlled based on channel information pertaining to the channel between the transmitting apparatus and the present radio relay apparatus, channel information pertaining to the channel between the present radio relay apparatus and the receiving apparatus, and channel information pertaining to the channel for the direct wave transmitted directly from the transmitting apparatus to the receiving apparatus. Thereby, even in a case where a relay operation is conducted in the presence of a direct wave, the phase difference generated by the fading occurring from the relay operation may be corrected so that degradation of the communications quality may be prevented. In turn, even in a case where a receiving signal is relayed with the same frequency band as that of a direct wave within a mobile communication environment, benefits of the relaying operation may be enhanced, that is, the communications capacity may be increased and the frequency usage efficiency may be improved.

It is also noted that according to an embodiment, the amplitude gain of the radio relay apparatus may be controlled based on the channel information so that reception quality may be improved.

It is further noted that even in a case where a signal may be received from the transmitting apparatus (e.g., base station) to the receiving apparatus (e.g., mobile station) with sufficiently high power, the present embodiment may be used to reduce interference with other cells, for example.

Modified Embodiment

According to the first embodiment, the radio relay apparatus is arranged to correct the phase difference created by fading based on channel information pertaining to the channel between the transmitting apparatus and the present radio relay apparatus, channel information pertaining to the channel between the present radio relay apparatus and the receiving apparatus, and channel information pertaining to the channel for the direct wave transmitted directly from the transmitting apparatus to the receiving apparatus. However it is noted that the present invention is not limited to such an embodiment. For example, an embodiment may be conceived in which the phase difference between the channel directly received from the transmitting apparatus by the receiving apparatus and the channel received via the radio relay apparatus is determined at the receiving apparatus, and the determined phase difference is fed back to the radio relay apparatus so that the radio relay apparatus may conduct phase correction based on this feedback.

Second Embodiment

According to a second embodiment of the present invention, the radio relay apparatus is provided with a multi-carrier transmission function.

Figure 5:
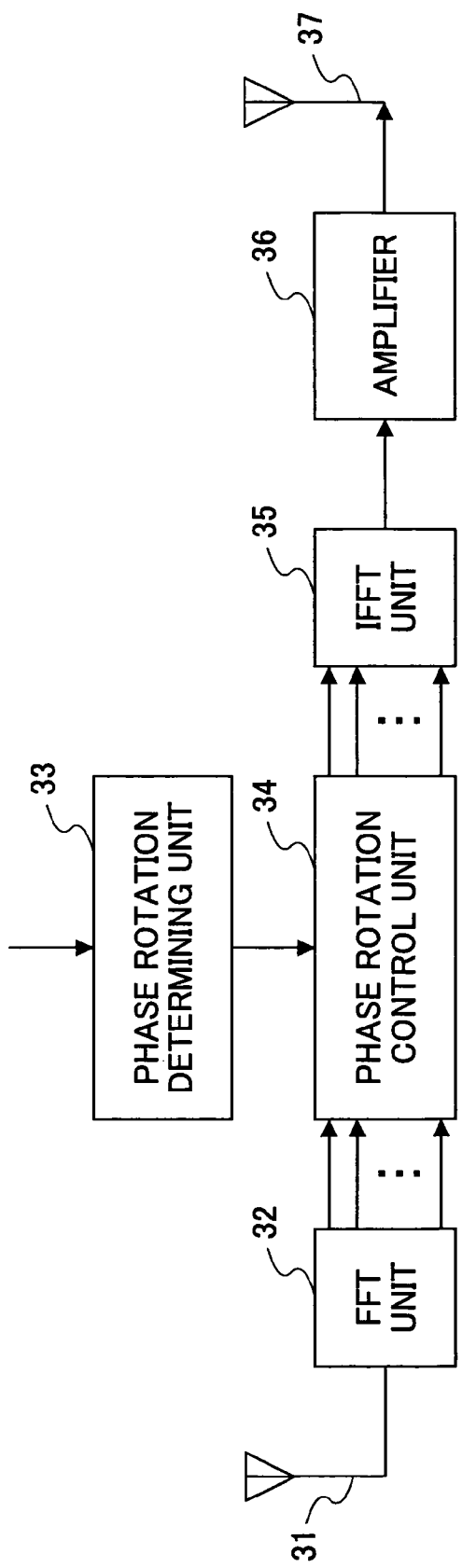
FIG. 5 is a block diagram showing an exemplary configuration of a radio relay apparatus according to a second embodiment of the present invention that uses the OFDM transmission scheme.

FIG. 5 is a block diagram showing an exemplary configuration of a radio relay apparatus according to the second embodiment that uses the OFDM transmission scheme as the multi-carrier transmission scheme.

According to the illustrated example of FIG. 5, the radio relay apparatus includes an FFT unit 32 and an IFFT unit 35 in addition to the components of the radio relay apparatus that are illustrated in FIG. 3. The IFFT unit 35 on the transmission side may be arranged to conduct an IFFT (Inverse Fast Fourier Transform) process on plural sets of symbol data to transform the data into a time signal (OFDM transmission signal). The FFT unit 32 on the receiving side may be arranged to conduct an FFT (Fast Fourier Transform) process on the received data to transform the data into frequency signals (OFDM reception signals).

According to the present embodiment, phase rotation may be realized using the methods described below:

(a) conducting phase rotation at once on sub carriers (b) conducting phase rotation for each sub carrier unit (c) conducting phase rotation for each block unit.

In the following, these phase rotation methods are described in greater detail.

In the case where phase rotation is conducted at once on the sub carriers (a), the radio relay apparatus may be arranged to have a configuration as is illustrated in FIG. 3. That is, the FFT unit 32 and the IFFT unit 35 may not be necessary. In this case, the phase rotation determining unit 33 determines the phase rotation based on the channel between the transmitting and receiving apparatuses for the sub carriers. For example, the phase rotation may be controlled so that the received signal power of the sub carriers may be maximized at the receiving apparatus.

In the case where the phase rotation is conducted for each sub carrier unit (b), the radio relay apparatus may have a configuration as is illustrated in FIG. 3, and the phase rotation may be controlled by conducting the operations described in relation to the first embodiment for each sub carrier.

In the case where the phase rotation is conducted for each block unit (c), the phase rotation may be controlled so that the received signal power at the receiving apparatus may be maximized with respect to each block. In this case, the radio relay apparatus may have an identical configuration to that of the radio relay apparatus conducting phase rotation control in sub carrier units; however, it is noted that the same phase rotation is applied to sub carriers belonging to the same block.

It is noted that in the case where the radio relay apparatus is arranged to conduct phase rotation for each sub carrier, the communications capacity may be increased effectively. However, in this case, a large amount of control information for transmitting the channel information may be required.

On the other hand, in the case where the phase rotation is conducted for each block or at once on the sub carriers, the required amount of control information may be reduced compared to the above case, but the extent of increase in the communications capacity may be smaller as well. However, generally, high channel correlation between adjacent sub carriers can be obtained so that sufficient increase in the communications capacity may be achieved even when phase rotation control is conducted in block units. In a case where the channel between the transmitting apparatus and the receiving apparatus may be regarded as a flat channel, identical effects may be obtained from conducting phase rotation control in sub carrier units and conducting phase control in block units.

In a case where OFDM signal transmission is conducted, even when a total gain over all sub carriers is fixed, the communications capacity may be effectively increased by varying the gain for each sub carrier. In this case, the phase rotation control unit 34 may correspond to a complex coefficient multiplying unit that conducts phase control as well as amplitude control. As for the amplitude control method, for example, the amplitude gain for each sub carrier may be arranged to be proportional to the channel amplitude between the transmitting apparatus and the receiving apparatus or the received signal amplitude of each sub carrier.

Third Embodiment

According to a third embodiment of the present invention, the radio relay apparatus may be used in MIMO (Multiple-Input Multiple-Output) channel signal transmission. In MIMO channel signal transmission, plural sets of information may be transmitted by radio from a transmitting apparatus using the same frequency band, and the radio signals with the same frequency band may be received at a receiving apparatus after which the signals may be separated into the respective information sets.

In the following, operations implementing a conventional MIMO channel signal transmission scheme are described in order to facilitate understanding of the present embodiment described below.

Figure 6:
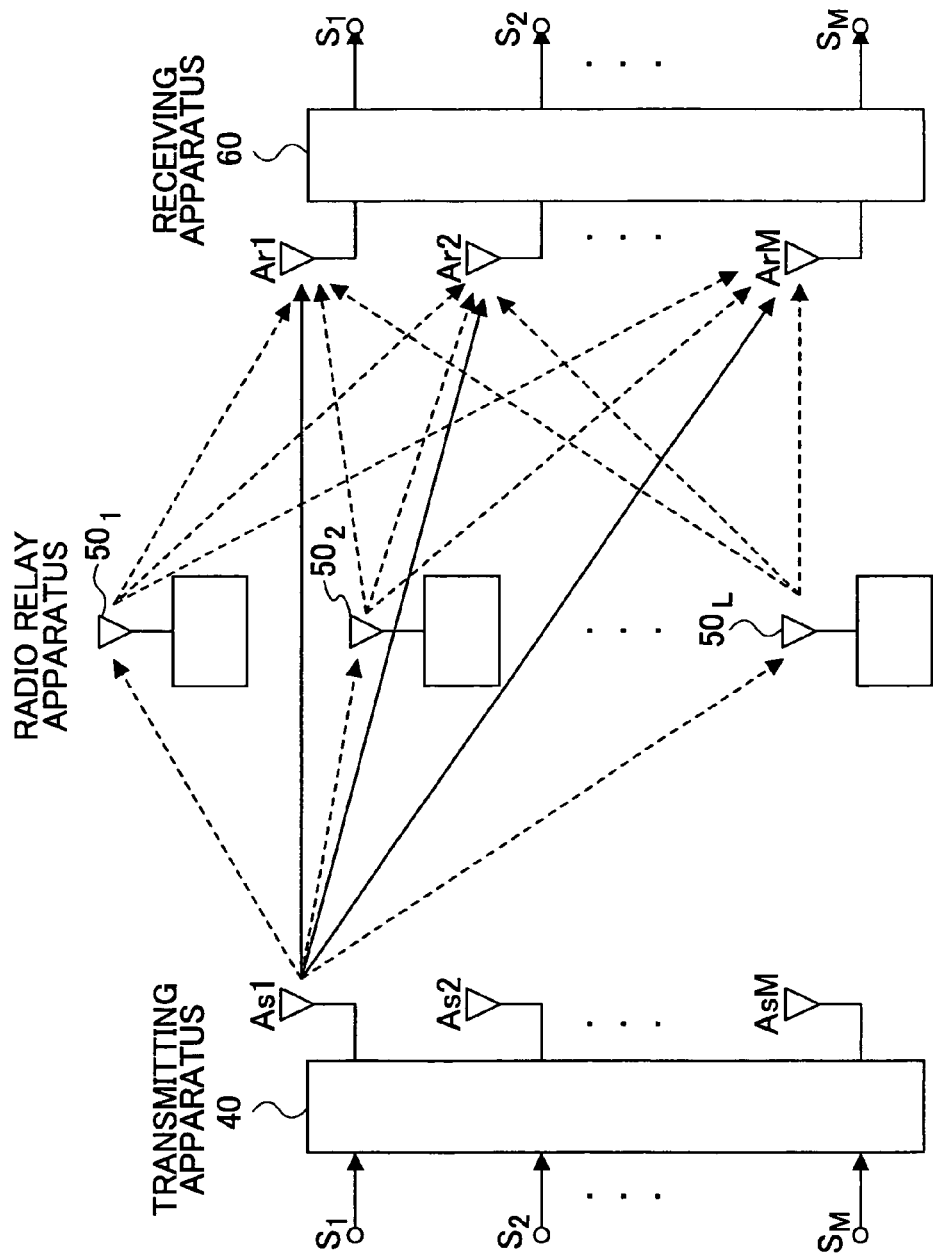
FIG. 6 is a diagram showing an exemplary configuration of a multiple location relay transmission system implementing a conventional MIMO channel signal transmission scheme.

FIG. 6 is a diagram showing an exemplary configuration of a multiple location relay transmission system implementing a conventional MIMO channel signal transmission scheme.

In the multiple location relay transmission system shown in this drawing, a transmitting apparatus 40 may transmit M (M corresponding to an integer at least equal to 2) sets of information, $S_1, \ldots, S_M$, from transmitting antennas, As1, ..., AsM, as vertical polarization radio signals with the same frequency band. The M radio signals may be received at each of L (L corresponding to an integer at least equal to 1) radio relay apparatuses 501, ..., 50L, and stored therein. Then, when transmission by the transmitting apparatus 40 is terminated by a transmission termination signal of one communication unit or one burst, for example, the accumulated radio signals may be amplified and transmitted to a receiving apparatus 60 as vertical polarization radio signals. The receiving apparatus 60 may be arranged to receive the vertical polarization radio signals via N (N corresponding to an integer at least equal to M) vertical polarization signal receiving antennas Ar1, ..., ArN, and conduct MIMO equalization processes on the received signals to separate the signals into the information sets $S_1, \ldots, S_M$.

In the following, a method of obtaining a complex coefficient (representing phase rotation/gain) that is used in a multiplication operation in the radio relay apparatus of the present embodiment during MIMO channel signal transmission is described. In the examples described below, it is assumed that the channel between the transmitting apparatus and the radio relay apparatus, and the channel between the radio relay apparatus and the receiving apparatus are determined beforehand by inserting pilot signals for the respective channels, for example.

In general, the channel capacity C in MIMO channel signal transmission may be represented by the following formula:

$$C = \log_2 \det(I + \rho/nt H_{total} \cdot H_{total}^H) \text{ [bit/Hz/s]}$$

(det representing a determinant, I representing a unit matrix, $\rho$ representing a received signal power to noise power ratio, nt representing the number of transmitting antennas, $H_{total}$ representing a channel matrix describing the channels between the transmitting apparatus and the receiving apparatus including the channel passing through the radio relay apparatus, and the superscript H representing a conjugate transpose).

A complex coefficient that maximizes the channel capacity C may be selected from predetermined candidates (of complex coefficients) and used.

When it is difficult to obtain a complex coefficient through analytical means, several phase rotations and gains maybe selected beforehand, and corresponding channel capacities C may be obtained to determine the largest channel capacity C.

It is noted that the complex coefficient does not necessarily have to be used in all the radio relay apparatuses being provided. For example, a portion of the radio relay apparatuses may be arranged to directly relay a received signal according to a conventional method, while another portion of the radio relay apparatuses may be arranged to multiply a received signal by the complex coefficient. Also, according to one embodiment, a heuristic algorithm may be used to progressively update the complex coefficient.

According to the present embodiment, in a case where there is no direct wave being transmitted from the transmitting apparatus to the receiving apparatus, the number of receiving antennas provided in the radio relay apparatus is preferably arranged to be greater than the number of transmitting antennas.

In the following, a control method for controlling the complex coefficient in MIMO channel signal transmission is described. It is noted that in the exemplary radio relay system described below, a radio relay apparatus having a differing polarization relaying function is used.

Figure 7:
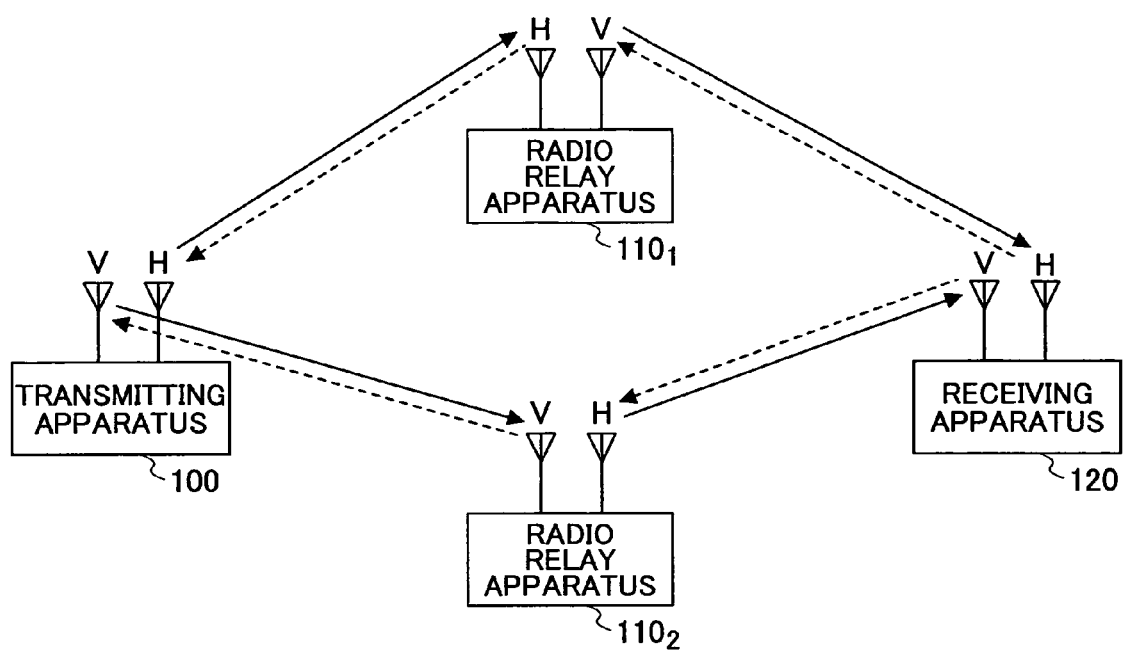
FIG. 7 is a diagram showing a configuration of a radio relay system that implements a radio relay apparatus having a differing polarization relaying function according to a third embodiment of the present invention.

FIG. 7 is a diagram showing a configuration of a radio relay system that implements a radio relay apparatus according to the third embodiment having a differing polarization relaying function.

The radio relay system as is illustrated in the present drawing includes a transmitting apparatus 100 having plural polarization antennas, plural radio relay apparatuses $110_1$ and $110_2$ each having plural polarization antennas, and a receiving apparatus 120 having plural polarization antennas.

In the following, a brief description of the orthogonal polarized plane relaying method is given. In FIG. 7, antenna H represents a horizontal polarization antenna, and antenna V represents a vertical polarization antenna. According to the differing polarization relaying method, polarizations that are orthogonal to the polarizations of the signals received at the radio relay apparatuses $110_1$ and $110_2$, respectively, are used to transmit signals in order to prevent the generation of sneak path. In the following, an example in which transmission is realized through polarization multiplexing using a vertical polarization antenna (V) and a horizontal polarization antenna (H) is described.

According to the present example, the radio relay apparatus $110_1$ corresponds to a radio relay apparatus that receives a signal at a horizontal polarization (H), and the radio relay apparatus $110_2$ corresponds to a radio relay apparatus that receives a signal at a vertical polarization (V). When using antennas of differing polarizations in relaying received signals, in the event that a direct wave to be received at the receiving apparatus 120 directly from the transmitting apparatus 100 is present, two interfering streams may be received at the receiving apparatus 120. However this problem may be resolved by using a receiving apparatus implementing the MIMO channel signal transmission scheme.

It is noted that in FIG. 7, the solid lines represent the flow of data signals, while the dotted lines represent the flow of feedback signals. In one embodiment, the feedback signal may be multiplexed with reverse link data.

The radio relay apparatuses of the present embodiment with differing polarization relaying functions may have configurations that are described below with reference to FIGS. 8 through 10, for example.

Figure 8:
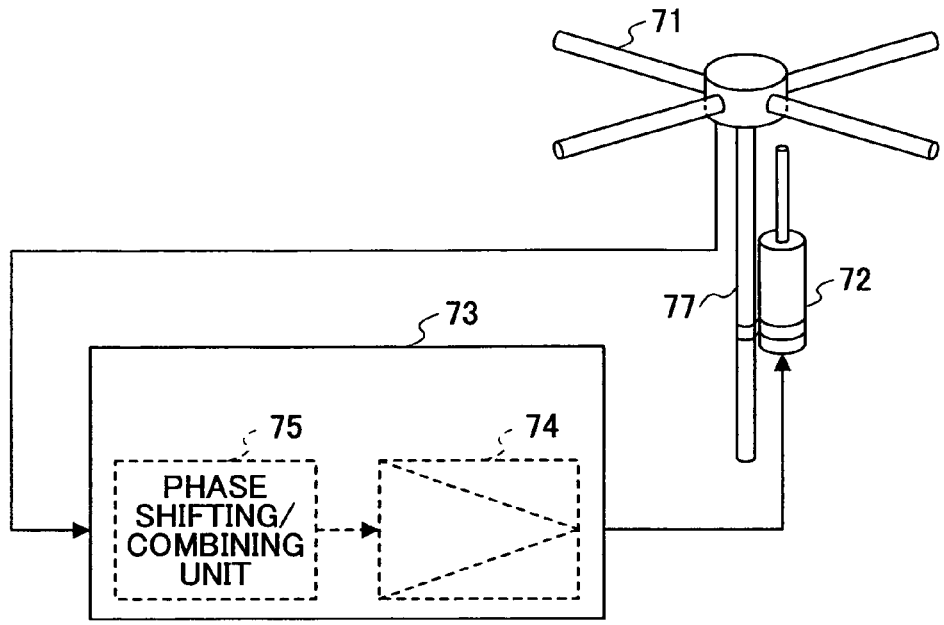
FIG. 8 is a diagram showing a first exemplary configuration of a radio relay apparatus having a different polarization relaying function.

FIG. 8 is a diagram showing a first exemplary configuration of the radio relay apparatus implementing a different polarization relaying function. According to the present example, the radio relay apparatus implements a receiving antenna and a transmitting antenna that have polarization characteristics that are orthogonal with respect to each other. In this drawing, the radio relay apparatus implements a horizontal polarization antenna as the receiving antenna 71 and a vertical polarization antenna as the transmitting antenna 72. More specifically, a horizontally positioned turn style antenna is used as the horizontal polarization antenna, and a vertically positioned sleeve (dipole) antenna is used as the vertical polarization antenna.

In the present example, a radio signal received at the horizontal polarization antenna 71 is amplified at an amplifier 74 that is accommodated within a box structure 73. It is noted that in this drawing, since a turn style antenna is used as the receiving antenna 71, the signals received at the two dipolar elements of the antenna are phase shifted by 90 degrees with respect to each other and combined at a phase shifting/combining unit 75, after which the resulting signal is input to the amplifier 74.

In the present example, the radio signal (wave) transmitted from the transmitting antenna 72 has a vertical polarization, and thereby, this signal may not be received by the horizontal polarization receiving antenna 71. By distinguishing the receiving and transmitting signals based on orthogonal polarizations, a high level of isolation may be achieved, and thereby, sneak path signals may be effectively avoided so that the relay amplitude gain may be increased. It is noted that the directional characteristics of the horizontal planes of both antennas 71 and 72 may be approximately arranged to be non-directional. As for the vertical planes, the directional characteristic of the turn style antenna 71 may include a direction toward the sleeve antenna 72 (downward direction); however the directional characteristic of the sleeve antenna 72 is null with respect to a direction toward the turn style antenna 71. Thereby, the transmitting signal from the transmitting antenna 72 may be prevented from being received at the receiving antenna 71 in this regard as well.

It is noted that according to another example, a vertical polarization antenna may be used as the receiving antenna 71, and a horizontal polarization antenna may be used as the transmitting antenna 72. It is also noted that antennas other than a turn style antenna such as a micro strip antenna, which has a substantially non-directive horizontal plane, may be used as the horizontal polarization antenna, and antennas other than a sleeve antenna such as a monopole antenna, which has a substantially non-directive horizontal plane, may be used as the vertical polarization antenna.

Figure 9:
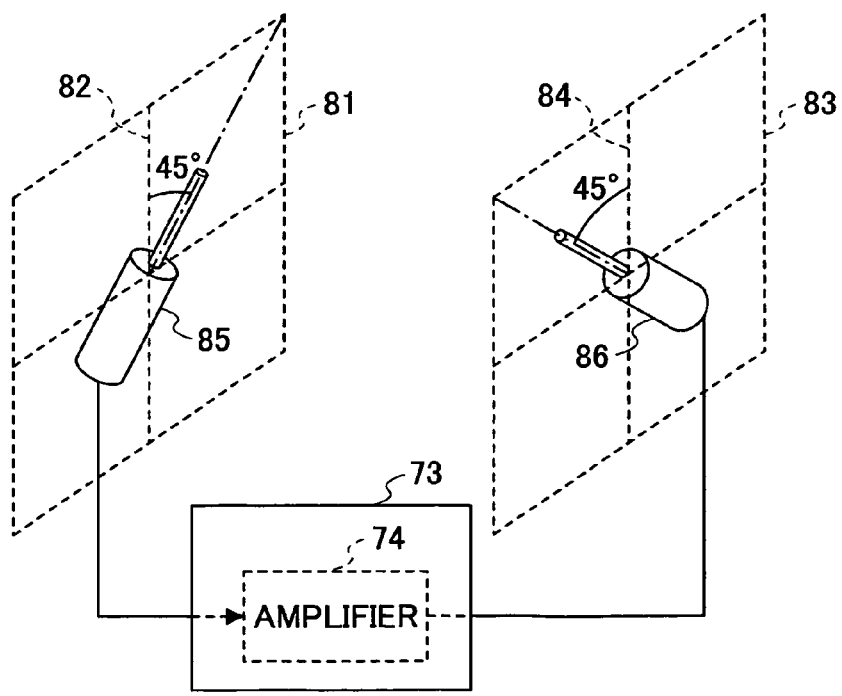
FIG. 9 is a diagram showing a second exemplary configuration of a radio relay apparatus having a differing polarization function.

FIG. 9 is a diagram showing a second exemplary configuration of a radio relay apparatus having a differing polarization function. According to the present example, the radio relay apparatus implements a receiving antenna and a transmitting antenna having diagonal polarizations that are orthogonal with respect to each other. In FIG. 9, a receiving antenna 85 corresponds to a sleeve (dipole) antenna that is tilted by 45 degrees in a clockwise direction with respect to a vertical line 82 on a vertical plane 81. A transmitting antenna 86 corresponds to a sleeve (dipole) antenna that is tilted by 45 degrees in a counter-clockwise direction with respect to a vertical line 84 on a vertical plane 83. In this way, the polarizations of the receiving antenna 85 and the transmitting antenna 86 may be orthogonal with respect to each other. It is also noted that the tilting angle of the antennas with respect to their corresponding vertical axes is not limited to the above example (i.e., 45 degrees). For example, the antennas may be tilted by different angles in opposite directions to realize orthogonal positioning with respect to each other.

According to the present example, the polarization of the radio signal being transmitted from the transmitting antenna 86 and the polarization of the wave being received at the receiving antenna 85 may be orthogonal with respect to each other as is the case in the first example, and thereby sneak path signals may be avoided and the relay amplitude gain may be increased. It is noted that in an alternative example, the receiving antenna 85 may be tilted in a counter-clockwise direction and the transmitting antenna 86 may be tilted in a clockwise direction with respect to their corresponding vertical lines. Also, antennas other than a sleeve antenna such as a monopole antenna, which has a substantially non-directional vertical plane (i.e., vertical with respect to the polarization of the antenna) may be used as the diagonal polarization antennas.

Figure 10:
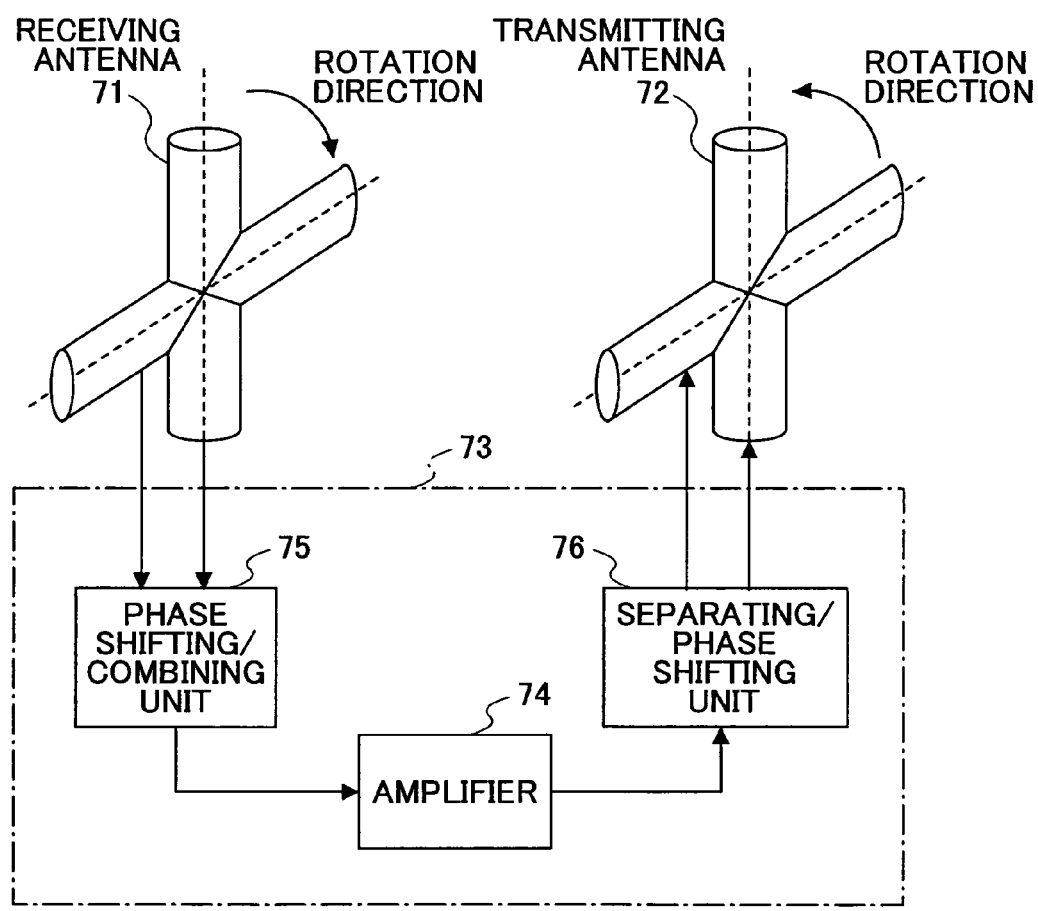
FIG. 10 is a diagram showing a third exemplary configuration of a radio relay apparatus having a differing polarization function.

FIG. 10 is a diagram showing a third exemplary configuration of a radio relay apparatus having a differing polarization function. According to the present example, the radio relay apparatus implements a left hand circular polarization antenna and a right hand circular polarization antenna is used as antennas with orthogonal polarization characteristics.

In the illustrated example of FIG. 10, a receiving antenna 71 corresponds to a vertically positioned right hand turn style antenna, the transmitting antenna 72 corresponds to a vertically positioned turn style antenna transmitting a left hand polarized signal, and the two antennas are arranged to face each other. The radio signals received at the two elements of the turn style antenna corresponding to the receiving antenna 71 are delayed with respect to each other by the phase shifting/combining unit 75 in a manner such that a vertical element signal may be delayed from a horizontal element signal by 90 degrees, after which the signals may be combined to be supplied to an amplifier 74. At the transmission side, an amplified signal from the amplifier 74 is separated into two signals by the separating/phase shifting unit 76, after which one of the separated signals is phase-delayed with respect to the other separated signal by 90 degrees. Then, the delayed signal is supplied to the horizontal element and the nondelayed signal is supplied to the vertical element of the turn style antenna corresponding to the transmitting antenna 72.

According to the present example, the turning direction of the circular polarization of the radio signal (wave) transmitted from the transmitting antenna 72 is arranged to be in an opposite direction with respect to the turning direction of the polarization characteristic of the receiving antenna 71, and thereby, sneak path signals may be avoided so that the relay amplitude gain may be increased. It is noted that in an alternative example, a left hand circular polarization antenna may be used as the receiving antenna 71, and a right hand circular polarization antenna may be used as the transmitting antenna 72. It is also noted that antennas other than the turn style antenna such as a cross Yagi antenna or a micro strip antenna may be used as the circular polarization antennas.

Figure 11:
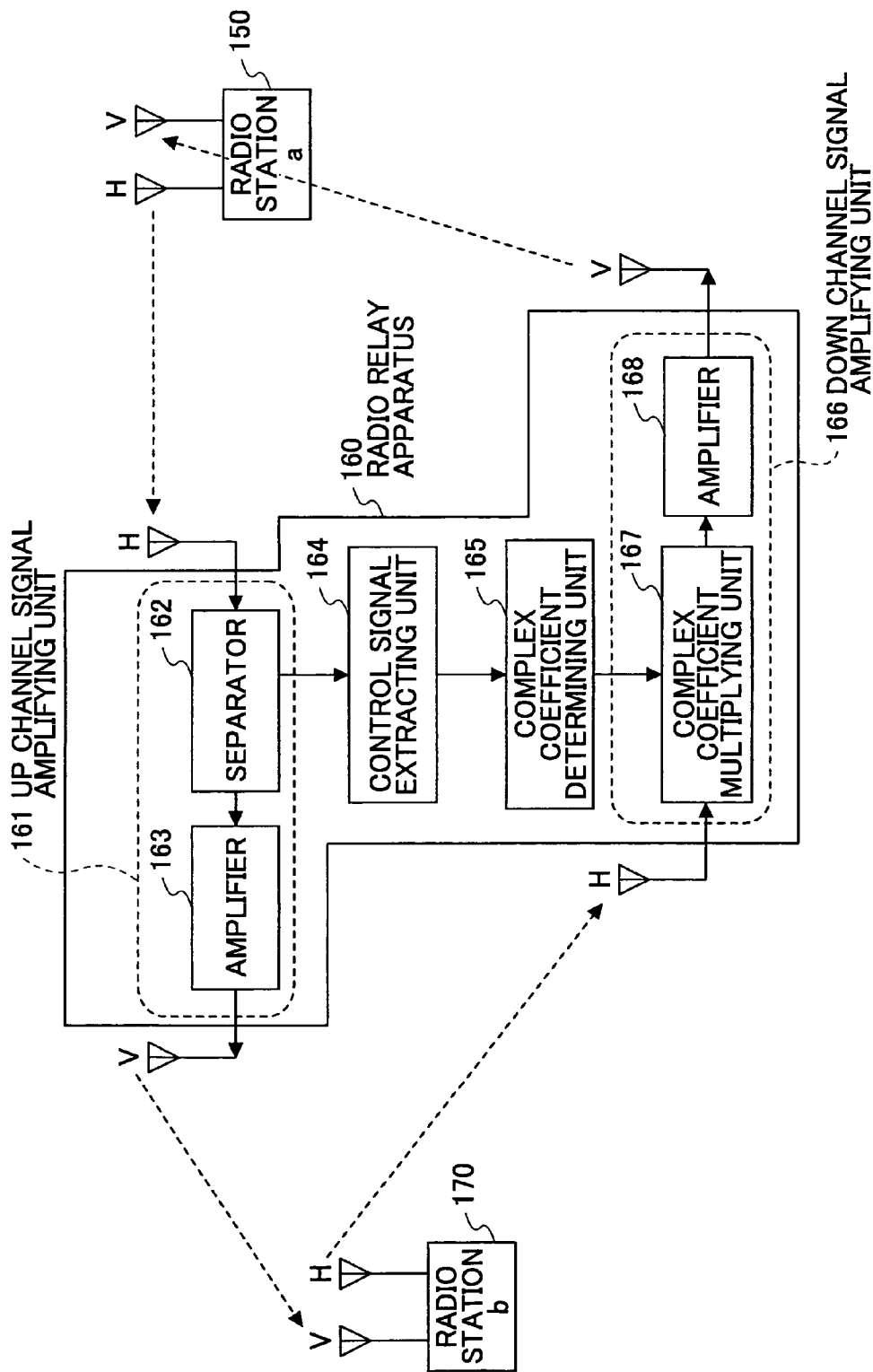
FIG. 11 is a diagram illustrating an exemplary application of an embodiment of the present invention to a radio relay apparatus having a differing polarization relaying function.

FIG. 11 is a diagram illustrating an exemplary application of the radio relay apparatus with a differing polarization relaying function. It is noted that the radio relay apparatus illustrated in FIG. 11 has a box structure that is different from the box structure 73 of the radio relay apparatuses illustrated in FIGS. 8 through 10.

The radio relay apparatus according to the present example includes an up channel signal amplifying unit 161, a down channel signal amplifying unit 166, a control signal extracting unit 164, and a complex coefficient determining unit 165. The up channel signal amplifying unit 161 includes a separator 162 and an amplifier 163. The down channel signal amplifying unit 166 includes a complex coefficient multiplying unit 167, and an amplifier 168. In the following, in order to simplify the description, emphasis is made on explaining the process of transmitting the down data signal, and the controlling the complex coefficient generated therein.

According to the illustrated example of FIG. 11, an up channel signal transmitted from a transmitting antenna (H) of a radio station a 150 is received at a receiving antenna (H) of a radio relay apparatus 160, and is divided into two by the separator 162. Then, one of the divided signals of the up channel signals is input to the amplifier 163 while the other one of the divided up channel signal is input to the control signal extracting unit 164 where a control signal is extracted. It is noted that a method of generating the control signal is described below. In the present example, it is assumed that the extracted control signal includes information pertaining to a complex coefficient that is used for multiplication in a relay operation. The control signal including such information is input to the complex coefficient determining unit 165 to determine the complex coefficient. For example, if a signal directing an increase of the gain is transmitted as the control signal, the complex coefficient determining unit 165 may determine the complex coefficient to control the gain of the amplifier 168, that is, to increase the current gain if such an increase is possible, or maintain the current gain if a signal is currently being relayed with the maximum gain.

It is noted that the gain may be determined using a conventional feedback information determining method for transmission power control. For example, provided that the required signal to noise ratio against modulation type and encoding bit rate and the received signal power to noise power ratio required by the encoding rate is held at the receiving side, in a case where the current received signal power does not reach the required level, a signal for increasing the gain may be transmitted, or in a case where the received signal power is excessive, a signal for decreasing the gain may be transmitted as the feedback signal.

The signal from a transmission antenna (H) of a radio station b 170 received by the receiving antenna (H) of the radio relay apparatus 160 and the complex coefficient multiplying unit 167 is multiplied by the complex coefficient determined at the complex coefficient determining unit 165 in the manner described above. Then, the resulting signal is amplified at the amplifier 168 and transmitted from the transmitting antenna (V) to the radio station a 150 as a down channel signal.

In the following, a phase rotation control operation of the radio relay apparatus according to the present embodiment is described.

Figure 12:
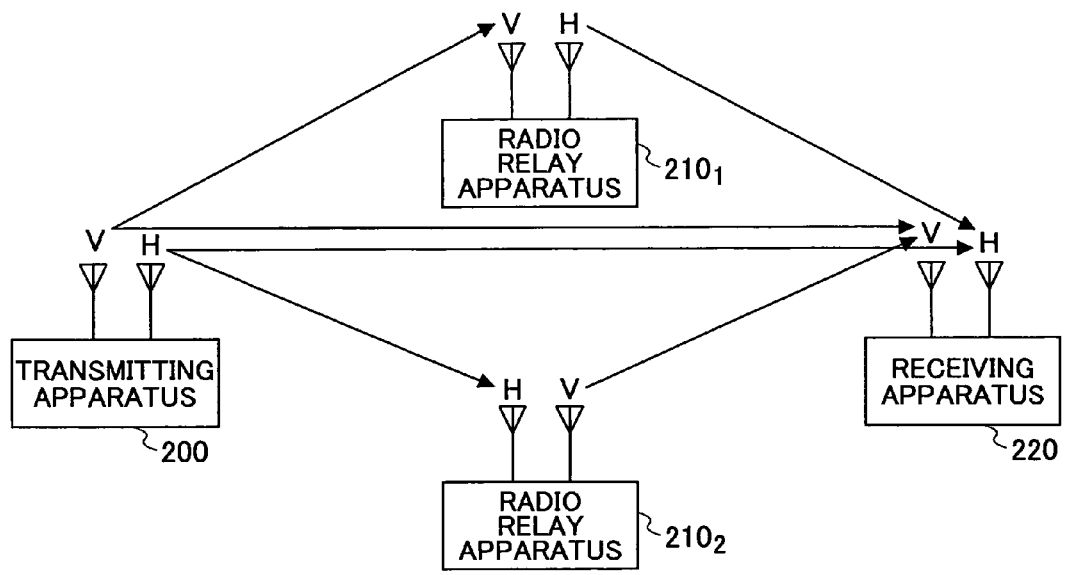
FIG. 12 is a diagram showing an exemplary configuration of a radio relay system in which phase rotation control is conducted by a radio relay apparatus according to an embodiment of the present invention.

FIG. 12 is a diagram showing an exemplary configuration of a radio relay system in which a phase rotation control operation is conducted in a radio relay apparatus according to an embodiment of the present invention.

In the illustrated example of FIG. 12, a channel from a transmitting apparatus 200 to a receiving apparatus 220 is denoted as $h_{xy}$, wherein x denotes a receiving antenna index, and y denotes a transmitting antenna index. The transmitting apparatus 200 includes an first antenna 1 using a V (vertical) polarization and a second antenna 2 using a H (horizontal) polarization, and the receiving apparatus 220 includes a first antenna 1 using a H polarization and a second antenna 2 using a V polarization. Also, it is assumed that the cross polarization discrimination (ability to discriminate between a vertical wave and a horizontal wave) XPD=∞.

According to the present example, in a case where a phase rotation a is varied at a radio relay apparatus 210$_1$, a direct wave H, a relayed wave H', and the total channel $H_{total}$ including the direct wave H and the relayed wave H' may be represented as follows:

$$\text{Direct wave} \quad H = \begin{bmatrix} h_{11} & 0 \\ 0 & h_{22} \end{bmatrix}$$

$$\text{Relayed wave} \quad H' = \begin{bmatrix} 0 & \alpha h'_{12} \\ h'_{21} & 0 \end{bmatrix}$$

$$\text{Total Channel} \quad H_{total} = \begin{bmatrix} h_{11} & \alpha h'_{12} \\ h'_{21} & h_{22} \end{bmatrix}$$

Also, as is described above, the channel capacity of the MIMO channel may be represented as follows:

$$C = \log_2 \det(I + \rho/nt H_{total} \cdot H_{total}^H) \text{ [bit/Hz/s]}$$

Accordingly, a suitable value may be chosen for α such that the channel capacity C may be maximized. For example, in a case where two antennas are used in the transmitting apparatus 200 and the receiving apparatus 220, respectively, the channel capacity C may be analytically obtained. That is, the complex coefficient α may be arranged to be orthogonal to $h_{11}h_{22}(h_{12}h_{2l})^*$.

According to the present embodiment, a problem in the conventional MIMO transmission scheme occurring when there is high correlation between the channels formed by the transmitting antenna and the receiving antenna may be resolved by reducing such a correlation so that the communications capacity may be effectively increased by the MIMO channel signal transmission.

Also, according to the present embodiment, the communications capacity may be effectively increased even in a case where the correlation between the channels is not so high.

Fourth Embodiment

It is noted that in the third embodiment, a transmitting apparatus and a receiving apparatus that are arranged to implement plural antennas, and plural radio relay apparatuses implementing plural antennas are used to realize a radio relay system. According to a fourth embodiment of the present invention, a transmitting apparatus and a receiving apparatus that are each arranged to implement a single antenna, and plural radio relay apparatuses implementing plural antennas are used to realize a radio relay system.

Figure 13:
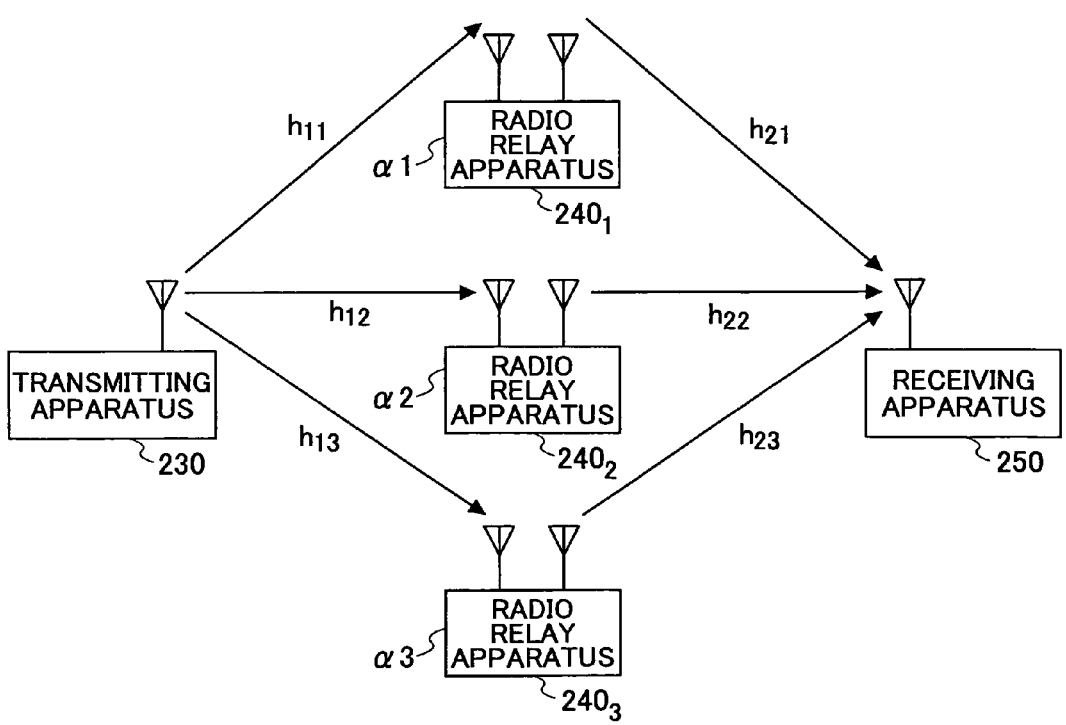
FIG. 13 is a diagram showing an exemplary configuration of a radio relay system according to a fourth embodiment of the present invention.

FIG. 13 is a diagram showing an exemplary configuration of a radio relay system according to the fourth embodiment.

The radio relay system illustrated in FIG. 13 includes a transmitting apparatus 230 implementing one antenna, a receiving apparatus 250 implementing one antenna, and three radio relay apparatuses $240_1$~$240_3$ implementing plural antennas.

In the present example, given that the channel from the transmitting apparatus 230 to the radio relay apparatus x (x=1~3) is denoted as $h_{1x}$, the channel from the radio relay apparatus x to the receiving apparatus 250 is denoted as $h_{2x}$, and the phase rotation/gain at the radio relay apparatus x is denoted as $\alpha_x$, signals received at the receiving apparatus 250 from the transmitting apparatus 230 via the radio relay apparatus x may be represented as follows:

$$\alpha_x h_{2x}(h_{1x} \times s + n_x) + n_r$$

It is noted that the signals are combined at the receiving antenna of the receiving apparatus, and thereby the received signal may be represented as follows:

$$\Sigma(\alpha_x h_{2x}(h_{1x} \times s + n_x)) + n_r$$

In the above formulas, $n_x$ represents the noise that is added at the radio relay apparatus x, and $n_r$ represents the noise that is added at the receiving apparatus 250.

According to the present embodiment, in order to maximize the SN ratio of the received signals at the receiving apparatus 250, $\alpha_x$ is set to be $\alpha_x = \alpha_x' \times h_{1x}/h_{2x}$ ($\alpha_x'$ corresponding to a positive real number that may be determined from a feedback from the receiving apparatus 250, for example).

It is noted that in the present example, plural radio relay apparatuses $240_1$~$240_3$ are provided, the transmitting apparatus 230 and the receiving apparatus 250 each implementing one single antenna. However, other configurations may also be conceived as is shown in FIG. 14, for example.

Figure 14:
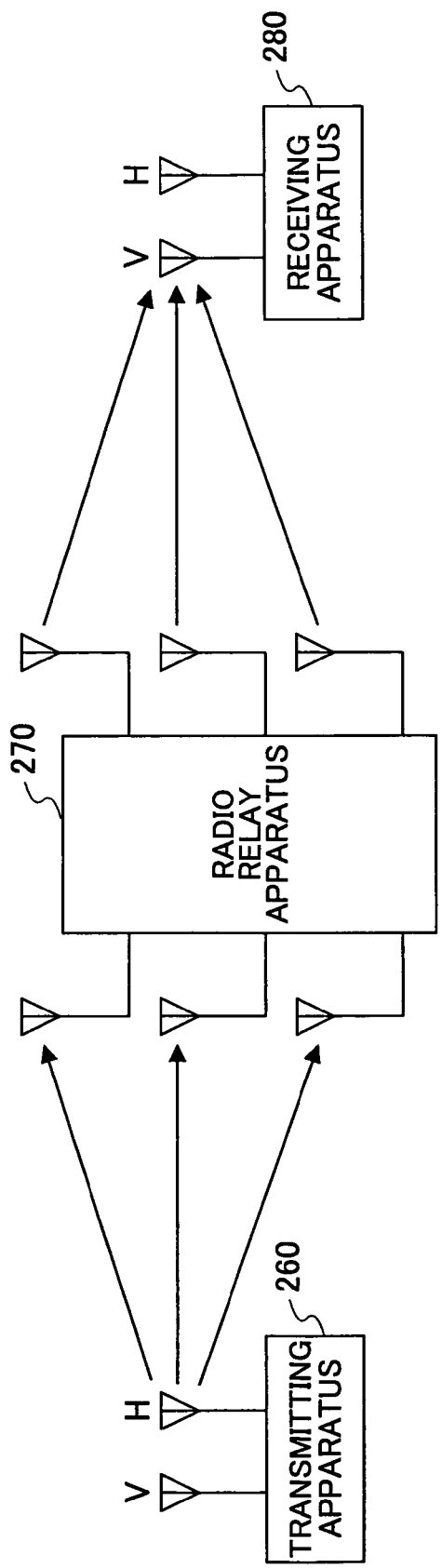
FIG. 14 is a diagram showing another exemplary configuration of a radio relay system according to the fourth embodiment.

In FIG. 14, one radio relay apparatus 270 is provided between a transmitting apparatus 260 and a receiving apparatus 280. The radio relay apparatus 270 includes plural transmitting antennas and plural receiving antennas. It is noted that the phase rotation control method as is described above may similarly be applied to this exemplary radio relay system configuration.

Fifth Embodiment

In the embodiments described above, it is assumed that the radio relay apparatus is informed of the channel information pertaining to the channel between the transmitting apparatus and the radio relay apparatus and the channel between the radio relay apparatus and the receiving apparatus. However, under the so-called multi-fading environment in which the radio channel may be in an ever-changing state, the channel information may vary over a relatively wide range. In this regard, measures are desired for accurately estimating the channel information, and efficiently conveying the estimated channel information to the radio relay apparatus.

Accordingly, in the following, an application of an embodiment of the present invention to a mobile communication system is described. It is noted that in an example described below, the TDD (Time Division Duplex) system for realizing uplink and downlink transmission using the same frequency through time division is used as a method for multiplexing the uplink and downlink channels to estimate the channel between the radio relay apparatus and the receiving apparatus and the channel between the radio relay apparatus and the transmitting apparatus in a mobile communication system.

Figure 15:
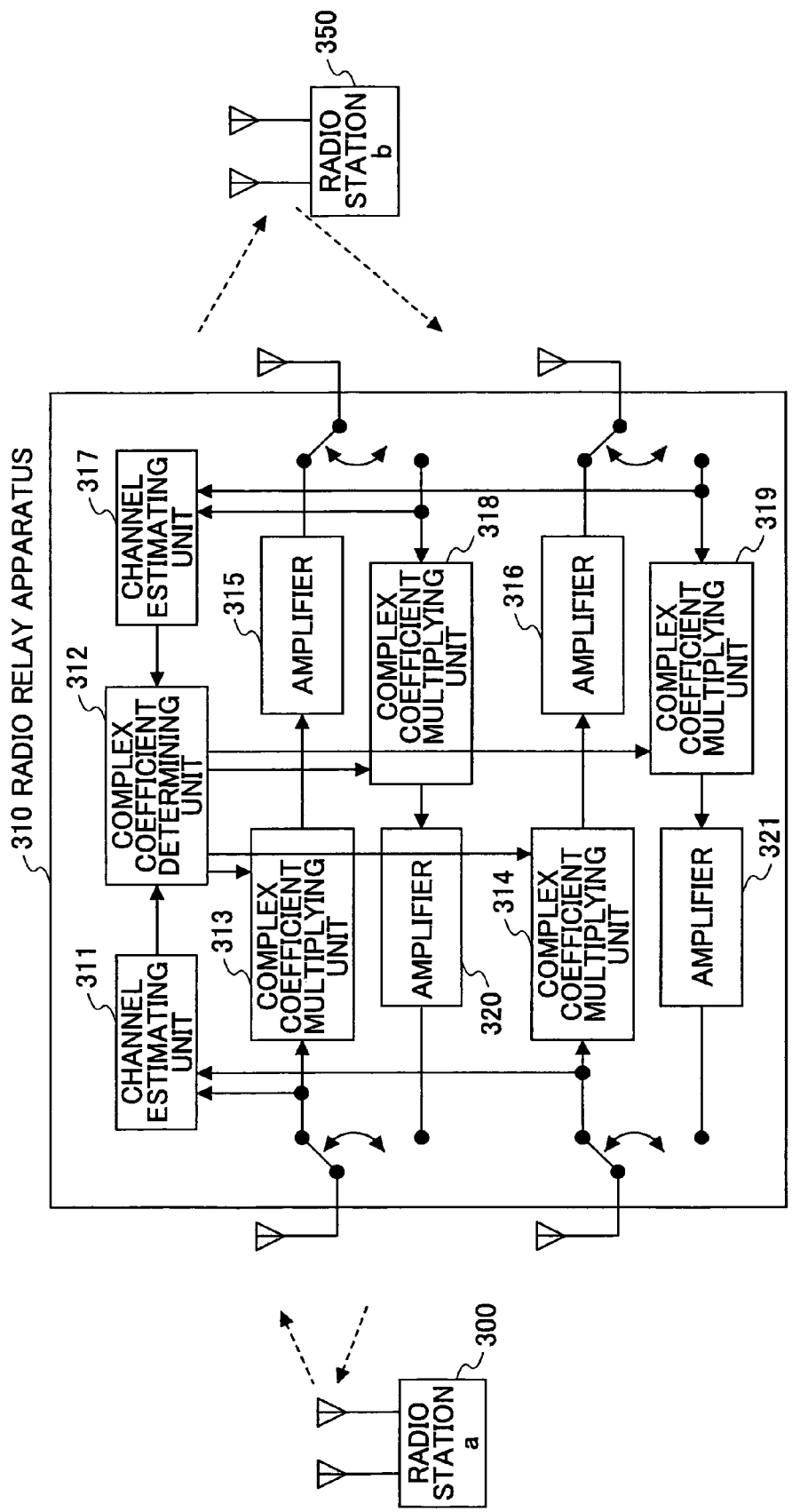
FIG. 15 is a diagram showing an exemplary configuration of a radio relay system implementing a radio relay apparatus that conducts channel estimation using the TDD according to a fifth embodiment of the present invention.

FIG. 15 is a diagram showing an exemplary configuration of a radio relay system including a radio relay apparatus that is arranged to conduct channel estimation using the TDD system.

According to the illustrated example of FIG. 15, a radio relay apparatus 310 may conduct channel estimation for the channel between a radio station a 300 and itself (radio relay apparatus 310) using a pilot signal that is inserted by the radio station a 300 upon transmitting a signal from the radio station a 300 to a radio station b 350.

When a pilot signal is transmitted from the radio station a 300, the radio relay apparatus 310 controls an antenna switch so that the pilot signal may be received at a channel estimating unit 311. When the pilot signal is input to the channel estimating unit 311, the phase and amplitude of the pilot signal is used based on which a phase rotation resulting from fading of the channel and the amplitude gain are estimated. The estimation result is then output to a complex coefficient determining unit 312 as channel information.

The complex coefficient determining unit 312 is arranged to determine the phase rotation and gain based on the channel information output by the channel estimating unit 311 to determine their corresponding complex coefficients and output the determined complex coefficients to complex coefficient multiplying units 313 and 314, respectively. The complex coefficient multiplying units 313 and 314 are each arranged to multiply a relayed signal by their corresponding input complex coefficient and output the multiplied signal to amplifiers 315 and 316, respectively. The amplifiers 315 and 316 are each arranged to input their corresponding multiplied signal from the complex coefficient multiplying units 313 and 314, respectively, amplify the relay signal, and transmit the amplified signal to the radio station b 350 via their respective transmitting antennas.

Also, the radio relay apparatus 310 may conduct channel estimation for the channel between the radio station b 350 and itself (radio relay apparatus 310) in the manner described above using a pilot signal inserted by the radio station b 300 upon transmitting a signal from the radio station b 350 to the radio station a 300.

By conducting the operations described above, the radio relay apparatus 310 may be provided with channel information pertaining to the channel between the radio station a 300 and itself (radio relay apparatus 310) and the channel between the radio station b 350 and itself (radio relay apparatus 310).

Herein, given that the channel between the radio station a 300 and the radio relay apparatus 310 is denoted as H, and the channel between the radio station b 350 and the radio relay apparatus 310 is denoted as H', the total channel between the radio station a 300 and the radio station b 350, denoted as $H_{total}$, may be represented as follows:

$$H_{total} = H' \times (\text{transfer function Z of radio relay apparatus}) \times H = H'ZH$$

Accordingly, the radio relay apparatus 310 may adjust the complex coefficient so that the channel capacity C that may be calculated from $H_{total}$ may be maximized.

It is noted that in the present example, it is assumed that a direct wave to be transmitted between the radio station a 300 and the radio station b 350 (between transmitting and receiving apparatuses) is not present. In the following, an exemplary case is described in which a direct wave is transmitted between the radio station a 300 and the radio station b 350.

According to the present example, a pilot signal that is not relayed to the radio relay apparatus 310 is used at the radio station b 350 corresponding to the receiving side to estimate the channel $H_d$ between the radio station a 300 and the radio station b 350 for the direct wave. Then, the estimated channel information pertaining to the channel between the radio station a 300 and the radio station b 350 is transmitted from the radio station b 350 to the radio relay apparatus 310. In turn the radio relay apparatus 310 adjusts the complex coefficient based on channel information $H_{total} + H_d$ instead of the channel information pertaining to the channel from the radio station a 300 to the radio station b 350 via the radio relay apparatus 310 (denoted to as $H_i$) to maximize the channel capacity C.

According to the present embodiment, the channel information pertaining to the channel between the radio station a 300 and the radio relay apparatus 310 and the channel between the radio station b 350 and the radio relay apparatus 310 may be efficiently transmitted to the radio relay apparatus 310.

It is noted that in the above descriptions, a mobile communication system implementing the TDD system is used as an exemplary application of the present embodiment. However, the present invention is not limited to such application, and for example, the present invention may equally be applied to a mobile communication system implementing the FDD (Frequency Division Duplex) system as a method for multiplexing the uplink and down link channels.

Sixth Embodiment

In a mobile communication system using FDD, the radio relay apparatus is unable to directly estimate the channel between the radio relay apparatus itself and the transmitting apparatus. In turn, according to a sixth embodiment of the present invention, the radio relay apparatus is arranged to transmit a pilot signal, and the receiving apparatus is arranged to conduct channel estimation using the pilot signal transmitted from the radio relay apparatus. Also, according to the present embodiment, the complex coefficient may be determined at the receiving apparatus and fed back to the radio relay apparatus.

In the following, a channel estimation method for a receiving apparatus according to the present invention is described.

Figure 16:
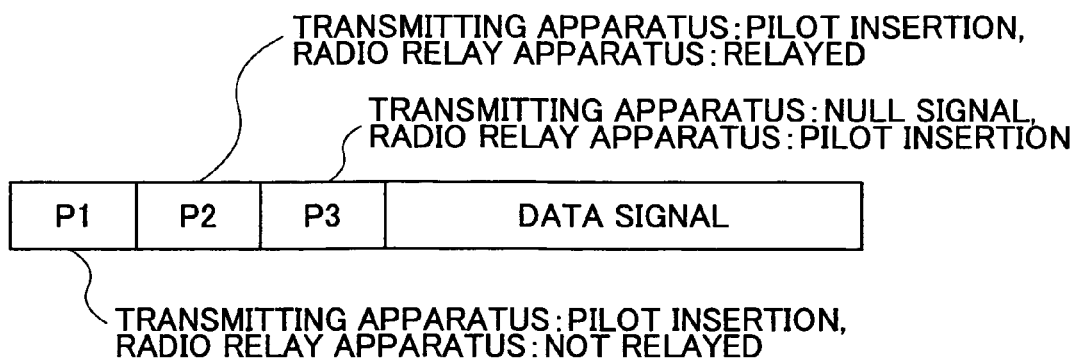
FIG. 16 is a diagram illustrating an exemplary configuration of a radio frame according to a sixth embodiment of the present invention.

FIG. 16 is a diagram illustrating an exemplary radio frame used in the present embodiment.

In the radio frame of FIG. 16, a pilot signal is inserted into section P1 by the transmitting apparatus. It is noted that this pilot signal is not relayed to the radio relay apparatus. Another pilot signal is inserted into section P2 by the transmitting apparatus in a similar manner, and this pilot signal is relayed to the radio relay apparatus. Also, the transmitting apparatus transmits a null signal in section P3, and in turn, the radio relay apparatus inserts a pilot signal into the transmitted null signal section P3.

Figure 17:
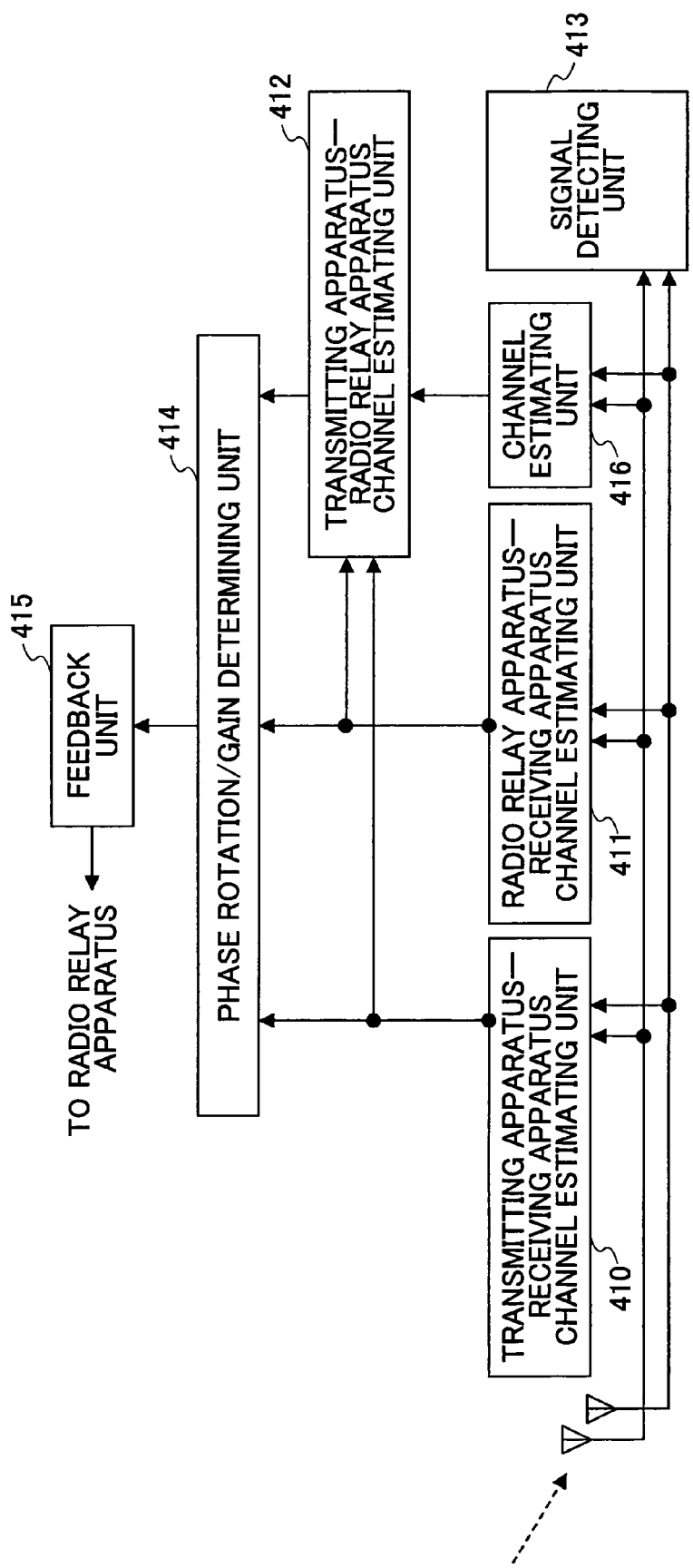
FIG. 17 is a diagram showing an exemplary configuration of a receiving apparatus according to the sixth embodiment.
Figure 18:
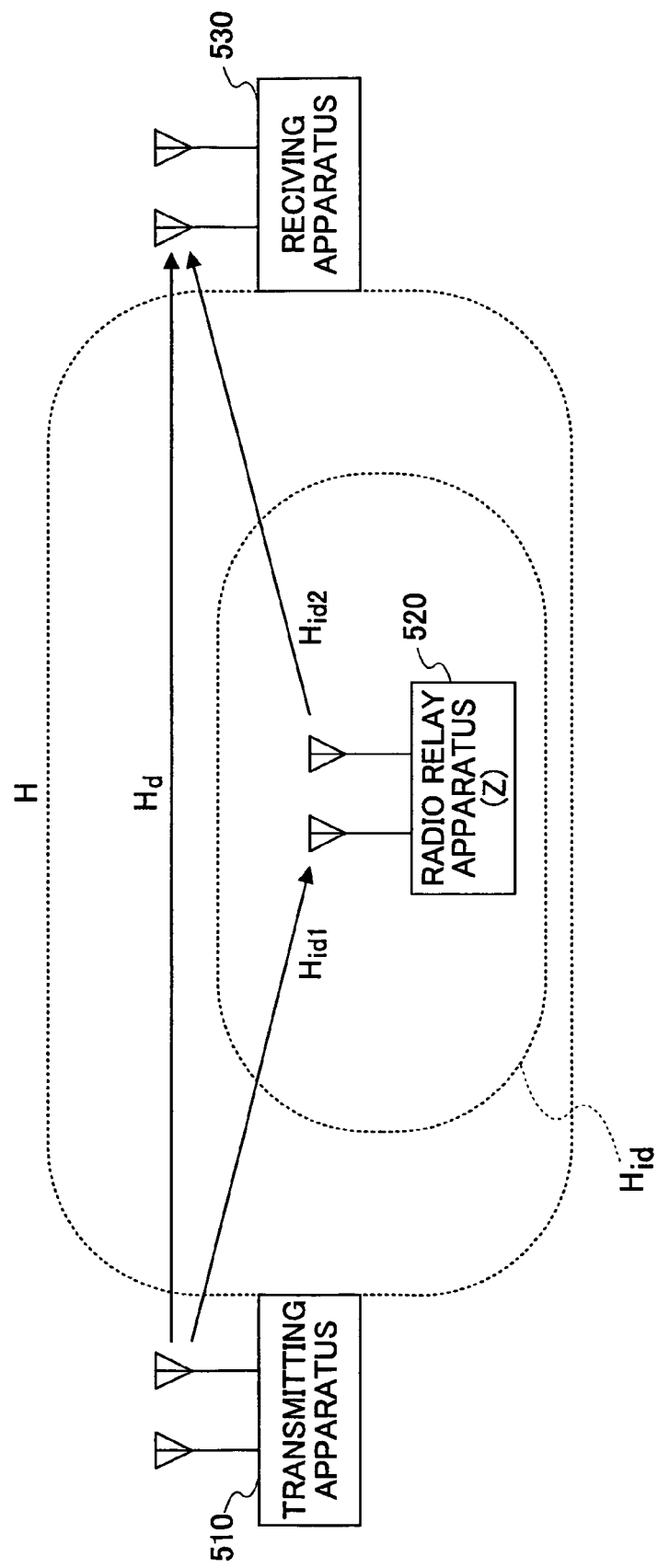
FIG. 18 is a diagram showing an exemplary configuration of a radio relay system and channel information for obtaining a complex coefficient.

FIG. 17 is a diagram showing an exemplary configuration of a receiving apparatus according to the present embodiment, and FIG. 18 is a diagram showing channel information of channels used in obtaining complex coefficients according to the present embodiment.

The receiving apparatus shown in FIG. 17 includes a transmitting apparatus-receiving apparatus channel estimating unit 410, a radio relay apparatus-receiving apparatus channel estimating unit 411, a transmitting apparatus-radio relay apparatus channel estimating unit 412, a signal detecting unit 413, a phase rotation/gain determining unit 414, a feedback unit 415, and a channel estimating unit 416. The transmitting apparatus-receiving apparatus channel estimating unit 410 is arranged to conduct channel estimation for a channel $H_d$ (see FIG. 18) between the transmitting apparatus and the receiving apparatus based on the pilot signal P1 (estimation of $H_d$ from P1). The radio relay apparatus-receiving apparatus channel estimating unit 411 is arranged to conduct channel estimation for the channel $H_{id2}$ between the radio relay apparatus and the receiving apparatus based on the pilot signal P3 (estimation of $H_{id2}$ from P3). The channel estimating unit 416 is arranged to estimate $H_d + (H_{id1} \times Z \times H_{id2})$ as the total channel $H_{total}$ based on the pilot signal P2 and the channel estimations ($H_d$ and $H_{id2}$) obtained at the channel estimating units 410 and 411, and supply the resulting channel estimation to the transmitting apparatus-radio relay apparatus channel estimating unit 412. The transmitting apparatus-radio relay apparatus channel estimating unit 412 is arranged to estimate $H_{id1} \times Z$, which may be obtained from calculating $(H_{id2})^{-1} \times (H_{total} - H_d)$. In this way, the transmitting apparatus-radio relay apparatus channel estimating unit 412 is arranged to conduct channel estimation for the channel $H_{id1}$ between the transmitting apparatus and the radio relay apparatus based the channel estimation supplied from the channel estimating unit 416. With such a configuration, the channel information pertaining to the respective channels may be readily available to the receiving apparatus.

According to the present example, the channel information of the respective channels estimated by the channel estimating units 410~412 is supplied to the phase rotation/gain determining unit 414 at which complex coefficients representing the phase rotation and gain are determined. Then, the determined complex coefficients are processed into transmittable data at the feedback unit 415 to be transmitted to the radio relay apparatus. The signal detection unit 413 is arranged to detect a signal received from a receiving antenna based on the channel estimation result obtained at the transmitting apparatus-receiving apparatus channel estimating unit 410, and output the detection result to a subsequent equalizing unit (not shown) In this way, the received signal may be modulated at the modulation unit.

In the following, a method of obtaining a complex coefficient is described.

In FIG. 18, a transmitting apparatus 510, a radio relay apparatus 520, and a receiving apparatus 530 are shown. According to the present example, a channel $H_{id}$ that is received at the receiving apparatus 530 via the radio relay apparatus 520 may be represented as follows:

$$H_{id} = H_{id1} \times Z \times H_{id2}$$

Herein, $H_{id1}$ represents the channel between the transmitting apparatus 510 and the radio relay apparatus 520, Z represents a transfer function of the radio relay apparatus 520, and $H_{id2}$ represents the channel between the radio relay apparatus 520 and the receiving apparatus 530.

Also, it is noted that $H_{id2}$ may be represented as follows:

$$H_{id2} \propto (Z \times H_{id1})^{-1}$$

Herein, $Z \times H_{id1}$ represents a value that may be directly estimated at the radio relay apparatus 520 as in the previous embodiments based on a pilot signal transmitted from the transmitting apparatus 510.

However, according to the present example, the channel $H_{id1}$ between the transmitting apparatus 510 and the radio relay apparatus 520 is estimated at the receiving apparatus 530 taking into account influences of the radio relay apparatus 520. The estimation obtained in the above manner may be handled as channel information pertaining to the channel between the transmitting apparatus 510 and the radio relay apparatus 520 and a complex coefficient (or $Z \times H_{id1}$) may be calculated based on this channel information at the receiving apparatus 530. The complex coefficient (or a differential component between a previously calculated complex coefficient and the newly calculated complex coefficient) may then be transmitted to the radio relay apparatus 520 as a feedback signal. At the radio relay apparatus 520, the current complex coefficient may be multiplied by the newly calculated complex coefficient (or differential component) from the receiving unit 530 to update the current complex coefficient. In this way, the channel estimation value may be dynamically updated.

It is noted that the feedback signal may correspond to the control signal that is described above in relation to the embodiment of FIG. 11, and thus, information pertaining to the complex coefficient may be included in the control signal.

According to the embodiments of the present invention, the phase rotation and/or the gain associated with a signal relay operation within a radio relay apparatus may be determined and controlled based on channel information pertaining to a channel between a first radio station (transmitting apparatus) and a second radio station (receiving apparatus), channel information pertaining to a channel between the first radio station and the radio relay apparatus, and channel information pertaining to a channel between the radio relay apparatus and the second radio station. In this way, a phase difference caused by fading may be corrected so that degradation of communications quality may be prevented. In turn, relaying performance of the radio relay apparatus may be improved, communications capacity may be increased, and frequency resources may be used more efficiently.

Further, the present invention is not limited to the specific embodiments described above, and various changes and modifications may be made to these embodiments without departing from the scope of the present invention.

The present application is based on and claims the benefit of the earlier filing date of Japanese Patent Application No. 2004-038564 filed on Feb. 16, 2004, the entire contents of which are hereby incorporated by reference.

What is claimed is:

1. A radio relay system comprising:
   a first radio station;
   a second radio station; and
   a radio relay apparatus that relays a radio signal that is exchanged between the first radio station and the second radio station;
   wherein the radio relay apparatus includes
     a phase correction determining unit that determines a phase correction amount for the relayed signal based on channel information pertaining to channels established between the first radio station, the second radio station, and the radio relay apparatus; and
     a phase correction unit that corrects the relayed signal based on the phase correction amount determined by the phase correction determining unit,
   wherein the radio relay apparatus further includes,
   an amplitude correction determining unit that determines an amplitude correction amount for the relayed signal based on the channel information pertaining to channels established between the first radio station, the second radio station, and the radio relay apparatus; and
   an amplitude correction unit that corrects the relayed signal based on the amplitude correction amount determined by the amplitude correction determining unit, and
   wherein when the radio relay apparatus is arranged to relay a signal between the first radio station and the second radio station according to a Frequency Division Duplex system, the second radio station includes,
     a phase/amplitude control determining unit that conducts channel estimation for a channel between the first radio station and the radio relay apparatus, a channel between the radio relay apparatus and the second radio station, and a channel between the first radio station and the second radio station, and determines a gain and a phase rotation in the radio relay apparatus based on the channel estimation of the channels; and
     a feedback unit that transmits to the radio relay apparatus a feedback signal including information pertaining to the gain and phase rotation determined by the phase/amplitude control determining unit; and
   the radio relay apparatus includes,
     a phase/amplitude control unit that controls the gain and the phase rotation of the relayed signal according to the feedback signal transmitted from the feedback unit, wherein
   the first radio station includes a null signal transmitting unit that transmits a null signal as a section of a transmission signal;
   the radio relay apparatus includes a pilot signal relay unit that relays at least one of a plurality of pilot signals inserted by the first radio station, and a pilot signal inserting unit that inserts a predetermined pilot signal in the signal section transmitted as the null signal from the first radio station; and
   the second radio station includes,
     a direct channel estimating unit that conducts channel estimation for a channel directly received from the first radio station based on a received signal corresponding to at least one of the pilot signals that is received without being relayed by the radio relay apparatus;
     a radio relay apparatus-second radio station channel estimating unit that conducts channel estimation for a channel between the radio relay apparatus and the second radio station based on a received signal corresponding the predetermined pilot signal that is inserted by the radio relay apparatus; and
     a first radio station-radio relay apparatus channel estimating unit that conducts channel estimation for a channel between the first radio station and the radio relay apparatus based on a received signal corresponding to the at least one of the pilot signals that is relayed by the radio relay apparatus and the channel estimation for the channel between the radio relay apparatus and the second radio station.

2. The radio relay system as claimed in claim 1, wherein
the channel information corresponds to channel information pertaining to a channel between the first radio station and the second radio station, channel information pertaining to a channel between the first radio station and the radio relay apparatus, and channel information pertaining to a channel between the radio relay apparatus and the second radio station; and
at least one complex coefficient that represents at least one of the phase correction amount and the amplitude correction amount is determined based on the channel information.

3. The radio relay system as claimed in claim 1, wherein
the phase correction determining unit determines a complex coefficient representing a phase rotation of the relayed signal as the phase correction amount;
the phase correction unit multiplies the relayed signal by the determined complex coefficient representing the phase rotation;
the amplitude correction determining unit determines a complex coefficient representing a gain of an amplifier of the radio relay apparatus as the amplitude correction amount; and
the amplitude correction unit multiplies the relayed signal by the determined complex coefficient representing the gain.

4. The radio relay system as claimed in claim 3, wherein
when the first radio station and the second radio station are each provided with one antenna, and a plurality of the radio relay apparatuses each provided with a plurality of antennas are used,
the phase correction determining unit and the amplitude correction determining unit of at least one of the radio relay apparatuses are configured to calculate a complex coefficient representing the phase correction amount and a complex coefficient representing the amplitude correction amount, respectively, such that a transfer function from a receiving antenna of the at least one of the radio relay apparatuses to a receiving antenna of the second radio station maximizes a reception quality of a channel between the first radio station and the at least one of the radio relay apparatuses.

5. The radio relay system as claimed in claim 1, wherein
when the first radio station, the second radio station, and the radio relay apparatus are each provided with a plurality of antennas, and Multiple-Input Multiple-Output channels are formed by the antennas,
the phase correction determining unit and the amplitude correction determining unit are configured to calculate a complex coefficient representing the phase correction amount and a complex coefficient representing the amplitude correction amount, respectively, such that a channel capacity of channels between the first radio station, the second radio station, and the radio relay apparatus is maximized.

6. The radio relay system as claimed in claim 1 wherein
when signal transmission according to an Orthogonal Frequency Division Multiplexing transmission scheme is conducted,
the radio relay apparatus includes
an Inverse Fast Fourier Transform unit that conducts an inverse fast Fourier transform process on a transmission signal;
a Fast Fourier Transform unit that conducts a fast Fourier transform process on a received signal;
a complex coefficient determining unit that conducts channel estimation for channels of a plurality of sub carriers, and calculates one or more complex coefficients for the sub carriers based on the channel estimation; and
a complex coefficient multiplying unit that multiplies the sub carriers by the one or more complex coefficients calculated by the complex coefficient determining unit.

7. The radio relay system as claimed in claim 6, wherein
the sub carriers are collectively processed in calculating the complex coefficient and multiplying the calculated complex coefficient.

8. A radio relay apparatus that relays a radio signal that is exchanged between a first radio station and a second radio station, the apparatus comprising:
a phase correction determining unit that determines a phase correction amount for the relayed signal based on channel information pertaining to channels established between the first radio station, the second radio station, and the radio relay apparatus; and
a phase correction unit that corrects the relayed signal based on the phase correction amount determined by the phase correction determining unit,
wherein the radio relay apparatus further includes,
an amplitude correction determining unit that determines an amplitude correction amount for the relayed signal based on the channel information pertaining to channels established between the first radio station, the second radio station, and the radio relay apparatus; and
an amplitude correction unit that corrects the relayed signal based on the amplitude correction amount determined by the amplitude correction determining unit, and
wherein when the radio relay apparatus is arranged to relay a signal between the first radio station and the second radio station according to a Frequency Division Duplex system, the second radio station includes,
a phase/amplitude control determining unit that conducts channel estimation for a channel between the first radio station and the radio relay apparatus, a channel between the radio relay apparatus and the second radio station, and a channel between the first radio station and the second radio station, and determines a gain and a phase rotation in the radio relay apparatus based on the channel estimation of the channels; and
a feedback unit that transmits to the radio relay apparatus a feedback signal including information pertaining to the gain and phase rotation determined by the phase/amplitude control determining unit; and
the radio relay apparatus includes,
a phase/amplitude control unit that controls the gain and the phase rotation of the relayed signal according to the feedback signal transmitted from the feedback unit, wherein
the first radio station includes a null signal transmitting unit that transmits a null signal as a section of a transmission signal;
the radio relay apparatus includes a pilot signal relay unit that relays at least one of a plurality of pilot signals inserted by the first radio station, and a pilot signal inserting unit that inserts a predetermined pilot signal in the signal section transmitted as the null signal from the first radio station; and
the second radio station includes,
a direct channel estimating unit that conducts channel estimation for a channel directly received from the first radio station based on a received signal corresponding to at least one of the pilot signals that is received without being relayed by the radio relay apparatus;

a radio relay apparatus-second radio station channel estimating unit that conducts channel estimation for a channel between the radio relay apparatus and the second radio station based on a received signal corresponding the predetermined pilot signal that is inserted by the radio relay apparatus; and a first radio station-radio relay apparatus channel estimating unit that conducts channel estimation for a channel between the first radio station and the radio relay apparatus based on a received signal corresponding to the at least one of the pilot signals that is relayed by the radio relay apparatus and the channel estimation for the channel between the radio relay apparatus and the second radio station.

9. The radio relay apparatus as claimed in claim 8, further comprising:

an amplitude correction determining unit that determines an amplitude correction amount for the relayed signal based on the channel information pertaining to channels established between the first radio station, the second radio station, and the radio relay apparatus; and an amplitude correction unit that corrects the relayed signal based on the amplitude correction amount determined by the amplitude correction determining unit.

10. The radio relay apparatus as claimed in claim 9, wherein the channel information corresponds to channel information pertaining to a channel between the first radio station and the second radio station, channel information pertaining to a channel between the first radio station and the radio relay apparatus, and channel information pertaining to a channel between the radio relay apparatus and the second radio station; and at least one complex coefficient representing at least one of the phase correction amount and the amplitude correction amount is determined based on the channel information.

11. A radio relay method for relaying a radio signal that is exchanged between a first radio station and a second radio station, the method comprising the steps of:

determining at least one complex coefficient at a radio relay apparatus arranged to relay a signal between the first radio station and the second radio station according to a Frequency Division Duplex system, the complex coefficient representing at least one of a phase correction amount and an amplitude correction amount of the relayed signal based on channel information pertaining a channel between the first radio station and the second radio station, channel information pertaining to a channel between the first radio station and a radio relay apparatus, and channel information pertaining to a channel between the radio relay apparatus and the second radio station;

multiplying the relayed signal by the complex coefficient and outputting the multiplied signal;

determining an amplitude correction amount at the radio relay apparatus for the relayed signal based on the channel information pertaining to channels established between the first radio station, the second radio station, and the radio relay apparatus;

correcting the relayed signal at the radio relay apparatus based on the amplitude correction amount determined by the amplitude correction determination;

conducting channel estimation at the second radio station for a channel between the first radio station and the radio relay apparatus, a channel between the radio relay apparatus and the second radio station, and a channel between the first radio station and the second radio station;

determining a gain and a phase rotation in the radio relay apparatus based on the channel estimation of the channels;

transmitting from the second radio station to the radio relay apparatus a feedback signal including information pertaining to the gain and phase rotation determined by said step of conducting channel estimation;

controlling the gain and the phase rotation of the relayed signal at the radio relay apparatus according to the feedback signal transmitted by said step of transmitting the feed back signal;

transmitting a null signal by the first radio station as a section of a transmission signal;

relaying, by the radio relay apparatus at least one of a plurality of pilot signals inserted by the first radio station;

inserting a predetermined pilot signal by the radio relay apparatus in the signal section transmitted as the null signal from the first radio station;

conducting channel estimation by second radio station for a channel directly received from the first radio station based on a received signal corresponding to at least one of the pilot signals that is received without being relayed by the radio relay apparatus;

conducting channel estimation by second radio station for a channel between the radio relay apparatus and the second radio station based on a received signal corresponding the predetermined pilot signal that is inserted by the radio relay apparatus; and conducting channel estimation by second radio station for a channel between the first radio station and the radio relay apparatus based on a received signal corresponding to the at least one of the pilot signals that is relayed by the radio relay apparatus and the channel estimation for the channel between the radio relay apparatus and the second radio station.

* * * * *